US006961902B2

(12) United States Patent
Anecki et al.

(10) Patent No.: US 6,961,902 B2
(45) Date of Patent: Nov. 1, 2005

(54) INTERACTIVE SYSTEM FOR AND METHOD OF AUTOMATING THE GENERATION OF LEGAL DOCUMENTS

(75) Inventors: John A. Anecki, Newport Coast, CA (US); Alan T. Tang, Irvine, CA (US); Bernard F. Smet, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 801 days.

(21) Appl. No.: 09/801,949

(22) Filed: Mar. 7, 2001

(65) Prior Publication Data

US 2001/0034739 A1 Oct. 25, 2001

Related U.S. Application Data

(60) Provisional application No. 60/187,444, filed on Mar. 7, 2000.

(51) Int. Cl.[7] .............................................. G06F 17/24
(52) U.S. Cl. ...................................... 715/530; 715/505
(58) Field of Search ............................... 715/531, 530, 715/505; 707/10, 203

(56) References Cited

U.S. PATENT DOCUMENTS 5,313,394 A * 5/1994 Clapp ......................... 715/531
5,692,206 A * 11/1997 Shirley et al. .............. 715/531
6,067,531 A * 5/2000 Hoyt et al. ................... 705/35
6,161,113 A * 12/2000 Mora et al. ................. 715/505
6,189,009 B1 * 2/2001 Stratigos et al. .............. 707/10
6,236,984 B1 * 5/2001 Owens et al. ............... 707/203
6,502,113 B1 * 12/2002 Crawford et al. ........... 715/531
6,632,251 B1 * 10/2003 Rutten et al. ............... 715/530
2003/0120615 A1 * 6/2003 Kuo ............................ 705/78

OTHER PUBLICATIONS

Ferguson, Robert, Special Edition Using Microsoft Sharepoint Portal Server, Chapter 1—Introducing SharePoint, “Automatic Routing and Approval;” and Chapter 3—Overview of the Workspace and Dashboard “Approval Process Types” (Que Publishing © Aug. 2, 2002).*

Flannery, Ron, The Informix Handbook, Chapter 45—Creating and Using DataBlades “Infromix i.Reach: An Integrated DataBlade Corporate Information Repository” (Prentiss Hall Publishing © Aug. 14, 2000).*

* cited by examiner

*Primary Examiner*—Doug Hutton
(74) *Attorney, Agent, or Firm*—Christie, Parker & Hale, LLP

(57) ABSTRACT

A method and system for interactively generating legal documents by a requester for a recipient. A legal document server is established on a computer network to receive legal document requests from a legal document requester. Each legal document request includes recipient and subject matter information sufficient to create a legal document. The legal document server generates a legal document according to the legal document request using the recipient and subject matter information. The legal document server transmits the generated legal document directly to the recipient.

49 Claims, 27 Drawing Sheets

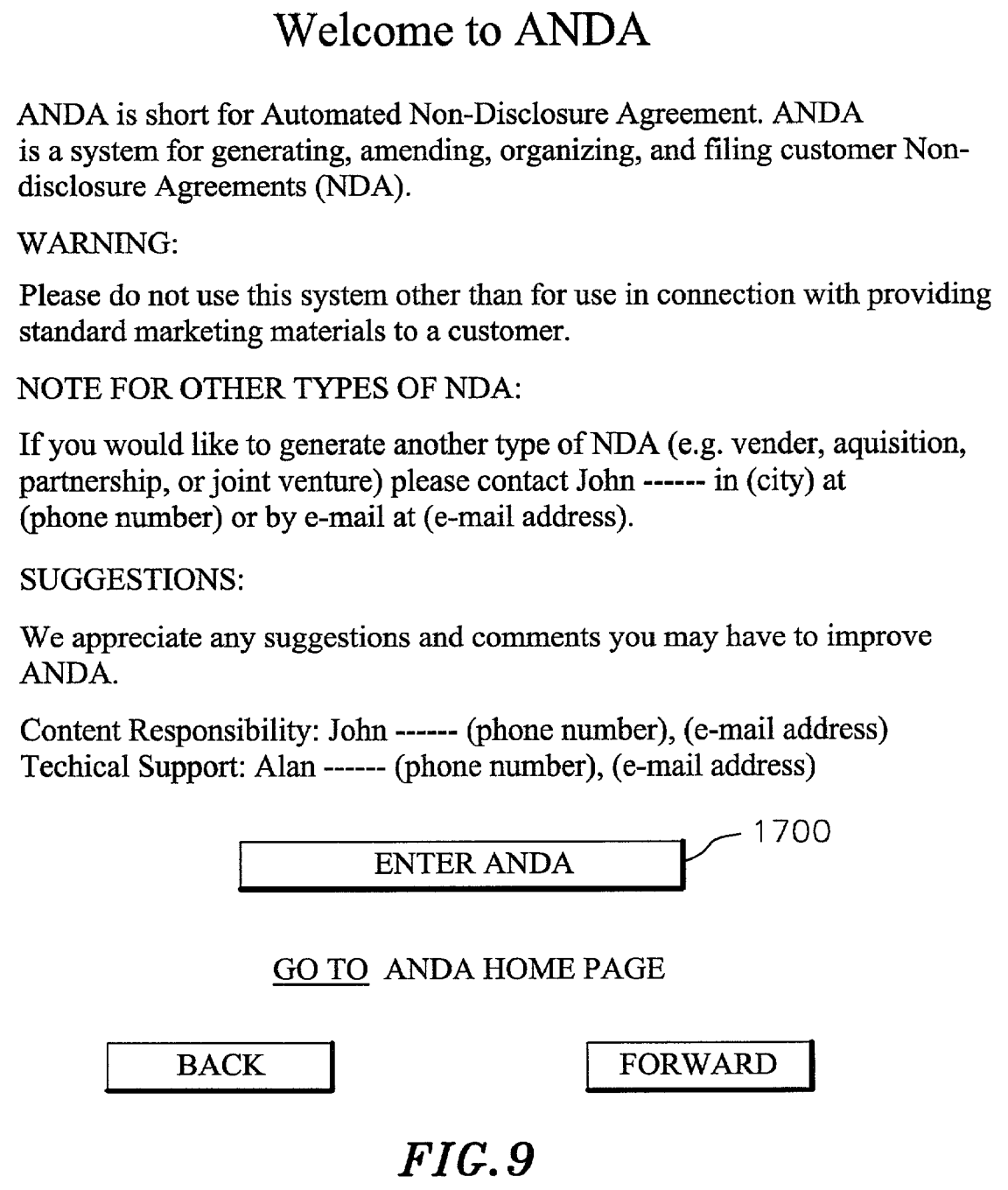

Welcome to ANDA

ANDA is short for Automated Non-Disclosure Agreement. ANDA is a system for generating, amending, organizing, and filing customer Non-disclosure Agreements (NDA).

WARNING:

Please do not use this system other than for use in connection with providing standard marketing materials to a customer.

NOTE FOR OTHER TYPES OF NDA:

If you would like to generate another type of NDA (e.g. vender, aquisition, partnership, or joint venture) please contact John ------ in (city) at (phone number) or by e-mail at (e-mail address).

SUGGESTIONS:

We appreciate any suggestions and comments you may have to improve ANDA.

Content Responsibility: John ------ (phone number), (e-mail address)
Techical Support: Alan ------ (phone number), (e-mail address)

1700

ENTER ANDA

GO TO ANDA HOME PAGE

BACK FORWARD

*FIG. 9*

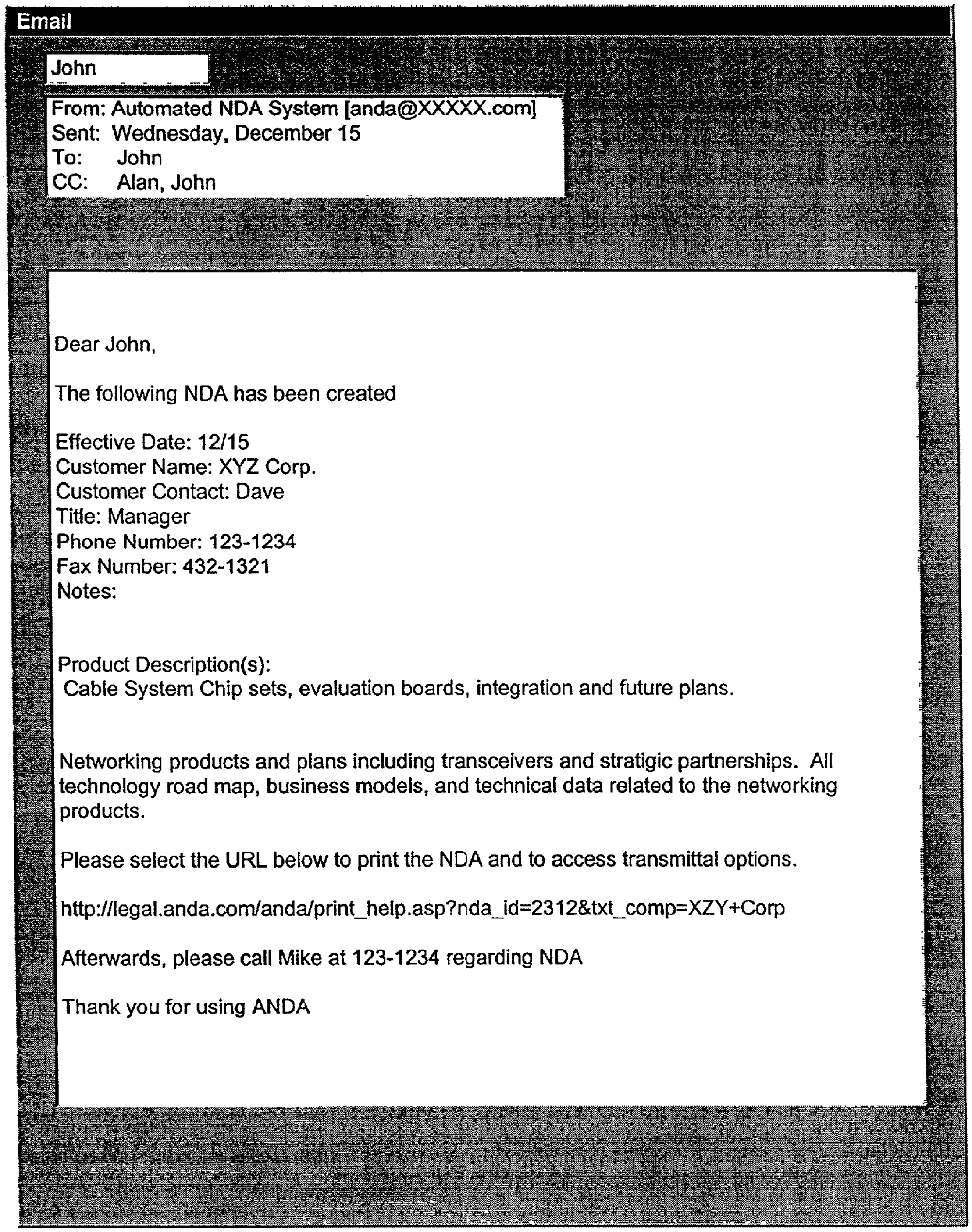
Email

John

From: Automated NDA System [anda@XXXXX.com]
Sent: Wednesday, December 15
To: John
CC: Alan, John Dear John, The following NDA has been created Effective Date: 12/15
Customer Name: XYZ Corp.
Customer Contact: Dave
Title: Manager
Phone Number: 123-1234
Fax Number: 432-1321
Notes:

Product Description(s):
Cable System Chip sets, evaluation boards, integration and future plans.

Networking products and plans including transceivers and stratigic partnerships. All technology road map, business models, and technical data related to the networking products.

Please select the URL below to print the NDA and to access transmittal options.

http://legal.anda.com/anda/print_help.asp?nda_id=2312&txt_comp=XZY+Corp

Afterwards, please call Mike at 123-1234 regarding NDA

Thank you for using ANDA

FIG. 13

JOINT NONDISCLOSURE AGREEMENT

This JOINT NONDISCLOSURE AGREEMENT (this "Agreement"). effective from the 15th day of December is made by and between ABC Corporation (ABC) having its principal place of business at 1234 Parkway, Anytown, CA, for itself and its Subsidiaries and XYZ Corp., having a place of business at 1234 Milton Ave, for itself and its subsidiaries ("Company"). 2402 2404

WHEREAS. Company and ABC: are desirous of exchanging certain proprietary. information ("Confidential Information") including without limitation technical data, business, financial and marketing plans, technology and product roadmaps, present and future product and integration plans, information on strategic partnerships and alliances and customer relationships, and other technical and business information regarding: 2400

Cable System Chip sets, evaluation boards, integration and future plans.

Networking products and plans including transceivers and stratigic partnerships. All technology road map, business models, and technical data related to the networking products. 2406

NOW THEREFORE, in consideration of the aforesaid disclosures and further in consideration of the rights, obligations and covenants hereinafter set forth, it is hereby agreed as follows:

I. The receiving party will hold in confidence any and all Confidential Information disclosed by the disclosing party (including, without limitation, any Confidential Information of a third party, which shall be considered to be Confidential Information of the disclosing party for purposes of this Agreement) and will exercise the same amount of diligence in presenting the secrecy of that information as the diligence used in presenting the secrecy of the receiving party's own most valuable Confidential Information. but in no event less than reasonable diligence.

II. Each party acknowledges that the Confidential Information comprises valuable trade secrets and proprietary information belonging to the other. The receiving party agrees not to disclose to any third party Confidential Information disclosed by the disclosing party nor to offer for sale or manufacture or otherwise dispose of to any third party devices or technology utilizing any of the disclosing party's Confidential Information (unless otherwise agreed by the disclosing party in writing). 2408

III. Information received from the disclosing party shall not be deemed to be Confidential Information if:

*FIG. 16*

A. The information is not provided to the receiving party in writing or electronic form and marked with a conspicuous written legend as being confidential or, if provided orally or visually. is not identified as confidential at the time of delivery and confirmed as confidential in writing to the receiving party within sixty (60) days thereafter or which a reasonable person would not recognize from the surrounding facts or circumstances to be confidential or secret:

B. The information is or becomes generally available to the public, except as the result of an unauthorized disclosure;

C. The information is known to the receiving party prior to receipt, and is not subject to a separate non-disclosure commitment on the part of the receiving party;

D. The information is or becomes available on an unrestricted basis to a third party other than front the receiving party' or from someone acting under its control (except that a corporate subsidiary of either party shall not be deemed a "third party" hereunder); or E. The information is independently developed by the receiving party without use of or recourse to Confidential Information of the disclosing party. In the event that a court or, any other governmental entity ("Authority") orders the receiving party to produce any of the disclosing party's Confidential Information, then the receiving party may produce only the information specifically required to be disclosed. In the event that any such order is proposed or issued, the receiving party will immediately notify the disclosing party' in writing of the order, and shall cooperate with the disclosing party if the disclosing party elects to object before the Authority regarding the disclosure.

IV. The disclosing party's Confidential Information shall be made available only to those employees of the receiving party who have reasonable need for such information only to assess the potential business transaction and under no circumstances shall Company's semiconductor division or any employee. officer. agent, or affiliate other than the work group or division of Company considering this transaction have access to the Confidential Information. Specifically, without limitation, each party acknowledges and agrees to use the other party's Confidential Information solely for the purpose of considering a potential business transaction with the other.

V. The Confidential Information and all intellectual property rights fixed, embodied, or otherwise subsisting therein or arising therefrom, and in all works, inventions, discoveries, know-how, techniques, processes, methods, systems, ideas and other elements thereof, are, and will remain the sole and exclusive property of its owner, over which the owner retains all ownership and all right, title. and interest. Nothing in this Agreement shall be construed to grant to either party any right or license under any patents, patent applications, trademarks, copyrights, mask works, trade secrets or know-foxy of the other party, except for the limited purpose of carrying out the evaluation contemplated by this Agreement. Company agrees that it will not use any of ABC's Confidential Information, and to the fullest extent permissible under applicable law will not use any ABC chip or chip set, to design, reverse engineer, or in anyway to facilitate or aid in the design of, a component, chip or chip set, whether for internal consumption or open market sale, or for any other purpose inconsistent with this Agreement.

VI. Neither party nor any of its employees, officers, representatives, agents or affiliates may copy Confidential information in whole or in part, absent the prior written consent of the other party. The receiving party within 10 days of the disclosing party's written request, will promptly return all Confidential Information received from the disclosing party, together with all copies, recordings, summaries or other reproductions thereof and all notes and/or other works prepared or

VII. The obligations of the receiving party' under paragraphs I, II, and III shall continue for a period of three (3) years from the effective date of disclosure of the Confidential Information. The remainder of the terms of this Agreement shall survive in perpetuity.

VIII. Although the parties are considering a potential business transaction, neither party has made any commitments to the other. Neither party has been given any assurance that any sort of transaction will ever be entered or even negotiated. Neither party is in anyway responsible for the other party's costs or expenses incurred in any negotiations that may occur. This Agreement constitutes the full and final understanding of the parties with respect to the subject matter hereof. This Agreement merges and supersedes any and all other agreements and representations. written or oral. relating to that subject matter. This Agreement may not be amended except by a writing expressly referring to this Agreement and signed by the authorized representatives of both parties. Any waiver of the requirements in this Agreement must be in writing and should not in any way be deemed a waiver to enforce any other requirements or provisions of this Agreement. If any provision of this Agreement is deemed unenforceable, then such provision will be severed from this Agreement and the remaining provisions will remain in full force and effect.

IX. The parties acknowledge that the unauthorized disclosure of the Confidential Information of one party by the other party may cause irreparable harm to the owner of such Confidential information that monetary damages alone may not redress. Each party is entitled to seek, from any court of competent jurisdiction, injunctive or other equitable relief to stop or prevent the unauthorized disclosure of such party's Confidential Information.

X. The receiving party will adhere to all applicable laws and regulations of the U.S. Export Administration and will not export or re-export any technical data or products received from the disclosing party, or the direct product of such technical data, to any prescribed person or country listed in the U.S. Export Administration regulations unless properly authorized by the U.S. government.

XI. The parties agree not to issue or release any articles, advertising, publicity or other public notice relating to any Confidential Information (including the fact that a meeting or discussion has taken place between the parties) or mentioning or implying the name of the other party, except as may be required by law' and then only after providing the other party with an opportunity to review and comment thereon.

XII. Each party shall be allowed to work with persons or entities that have independently developed information or materials similar to the Confidential Information; provided, however, that each party agrees to not disclose the fact that any similarity exists between the Confidential Information and the independently' developed information and materials, and each party understands that neither such similarity nor any other fact excuses it from its obligations under this Agreement.

XIII. This Agreement will be interpreted under California law, notwithstanding the choice of law rules of California or any other jurisdiction. The parties consent to the exclusive jurisdiction and venu of the state and federal courts located in Orange County, California to adjudicate any and all disputes arising under this Agreement. In the event of any action or proceeding to enforce or interpret any of the provisions of this Agreement, the prevailing party shall be entitled to be reimbursed for all costs of such action or proceeding, including attorney's fees and costs.

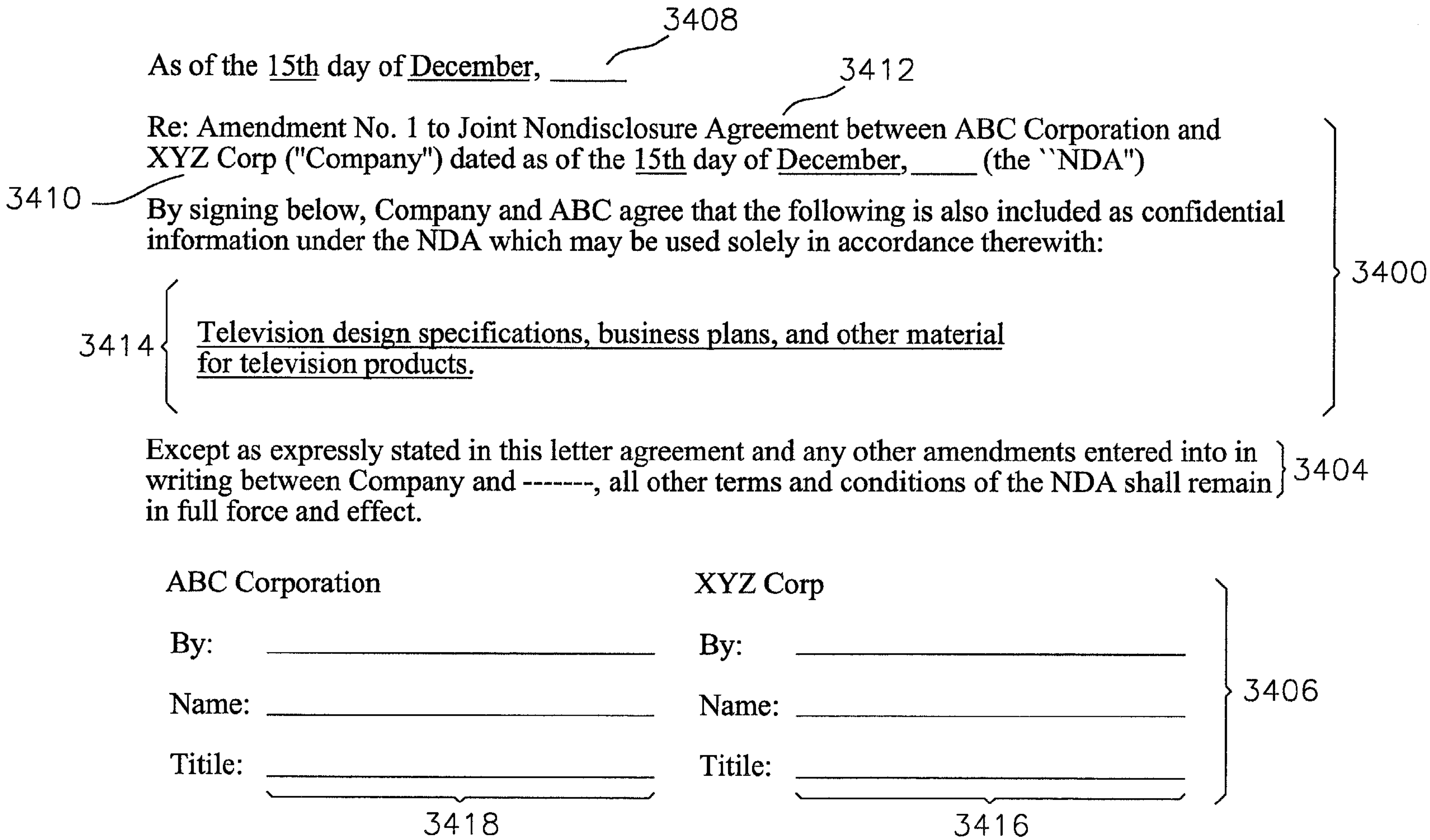

As of the 15th day of December, ____

Re: Amendment No. 1 to Joint Nondisclosure Agreement between ABC Corporation and XYZ Corp ("Company") dated as of the 15th day of December, ____ (the ``NDA")

By signing below, Company and ABC agree that the following is also included as confidential information under the NDA which may be used solely in accordance therewith:

Television design specifications, business plans, and other material for television products.

Except as expressly stated in this letter agreement and any other amendments entered into in writing between Company and -------, all other terms and conditions of the NDA shall remain in full force and effect.

| ABC Corporation | XYZ Corp |
|---|---|
| By: ____________ | By: ____________ |
| Name: ____________ | Name: ____________ |
| Titile: ____________ | Titile: ____________ |

FIG.26

INTERACTIVE SYSTEM FOR AND METHOD OF AUTOMATING THE GENERATION OF LEGAL DOCUMENTS

CROSS-REFERENCE TO RELATED APPLICATION(S)

This application claims the benefit of U.S. Provisional Application No. 60/187,444 filed Mar. 7, 2000 which is hereby incorporated by reference as if set forth in full herein.

BACKGROUND OF THE INVENTION

This invention relates generally to the field of document preparation and more specifically to increasing the efficiency of document preparation using computerized processing and scheduling methods.

In many business environments, large numbers of legally binding documents need to be generated, executed, and tracked by participants to certain business transactions. An example of such a business transaction is when a manufacturer releases to a customer a sample of a product before the product is made generally available. In this case, the manufacturer may want to protect the product sample, and the information associated with the product sample, using a non-disclosure agreement.

Generation, execution, and tracking of a legal document may be complicated by the number and distribution of the participants involved in a transaction. For example, a marketing representative may request a non-disclosure agreement from the manufacturer on behalf of a customer. The marketing representative may not be located at the manufacturer's location and communication of a request for a non-disclosure agreement may be difficult. Furthermore, the manufacturer may need to route the non-disclosure agreement through a number of different participants within the manufacturer's organization. Once approved and generated, the non-disclosure agreement may need to be sent to the customer for execution. Finally, the executed non-disclosure agreement may need to be returned to the manufacturer.

Therefore, a need exists for an automated, interactive, and distributed system for the coordination and generation of legal documents. The present invention meets such need.

SUMMARY OF THE INVENTION

The present invention comprises systems and methods for interactively generating legal documents by a requester for a recipient. A legal document server is established on a computer network to receive legal document requests from a legal document requester. Each legal document request includes recipient and subject matter information sufficient to create a legal document. The legal document server generates a legal document according to the legal document request using the recipient and subject matter information. The legal document server transmits the legal document directly to the recipient.

In one embodiment of the invention, the legal document server provides a process for obtaining approvals from at least one legal document administrator before generating a legal document.

In another embodiment of the present invention, the legal document server creates an approval status document. The approval status document includes the status of the approvals received for generation of a legal document. The legal document server provides the approval status document to the requester as a Web page via the Internet.

In another embodiment of the invention, the legal document server transmits a legal document generation notice to the legal document requestor via electronic mail after the legal document is generated. The legal document generation notice contains a hyperlink to a Web page containing a list of possible legal document transmission methods. The legal document requestor reviews the notification and then selects a transmission method.

In one embodiment of the invention, the legal document server transmits the legal document to the recipient by facsimile transmission. The legal document server transmits the legal document along with legal document execution instructions. In another embodiment of the invention, the legal document server transmits the legal document to the recipient by electronic mail.

In one embodiment of the invention, the legal document server uses a database to track pending and issued legal documents. The legal document server uses the legal document database to generate reports so that legal document requestors and administrators may track the status of pending and issued legal documents.

BRIEF DESCRIPTION OF THE DRAWINGS

These and other features, aspects, and advantages of the present invention will become better understood with regard to the following description, appended claims, and accompanying drawings where:

FIG. 9 is an initial process selection Web page for an embodiment of the present invention;

FIG. 13 legal document transmittal selection form for an embodiment of the present invention;

FIGS. 15–18 is an exemplary legal document as created by an embodiment of the present invention;

FIG. 26 is legal document amendment form of an embodiment of the present invention.

DETAILED DESCRIPTION OF THE INVENTION

The present invention is directed towards a document management system and method providing version-controlled documents. The present invention is implemented in a network-based environment. As used herein, "document" is any instrument conveying information, regardless of medium, including without limitation any printed publications, electronic files, or hypertext nodes. A network includes any communication mode used to transfer information, including documents, between locations or nodes, including without limitation, a local area network, a corporate intranet, a wide-scale internet, a telephonic network, a satellite-based network, and combinations thereof, regardless of the medium and manner in which the information is transmitted.

An embodiment of the present invention is presented in the context of preparing legally binding non-disclosure agreements (NDAs) for release of computer chip samples and specifications to certain customers before the computer chips and specifications are male available to the general public. Those skilled in the art of computerized document preparation and computer science will appreciate that the present invention may be used for the preparation of other types of legally binding documents and documents in general.

Figure 1:
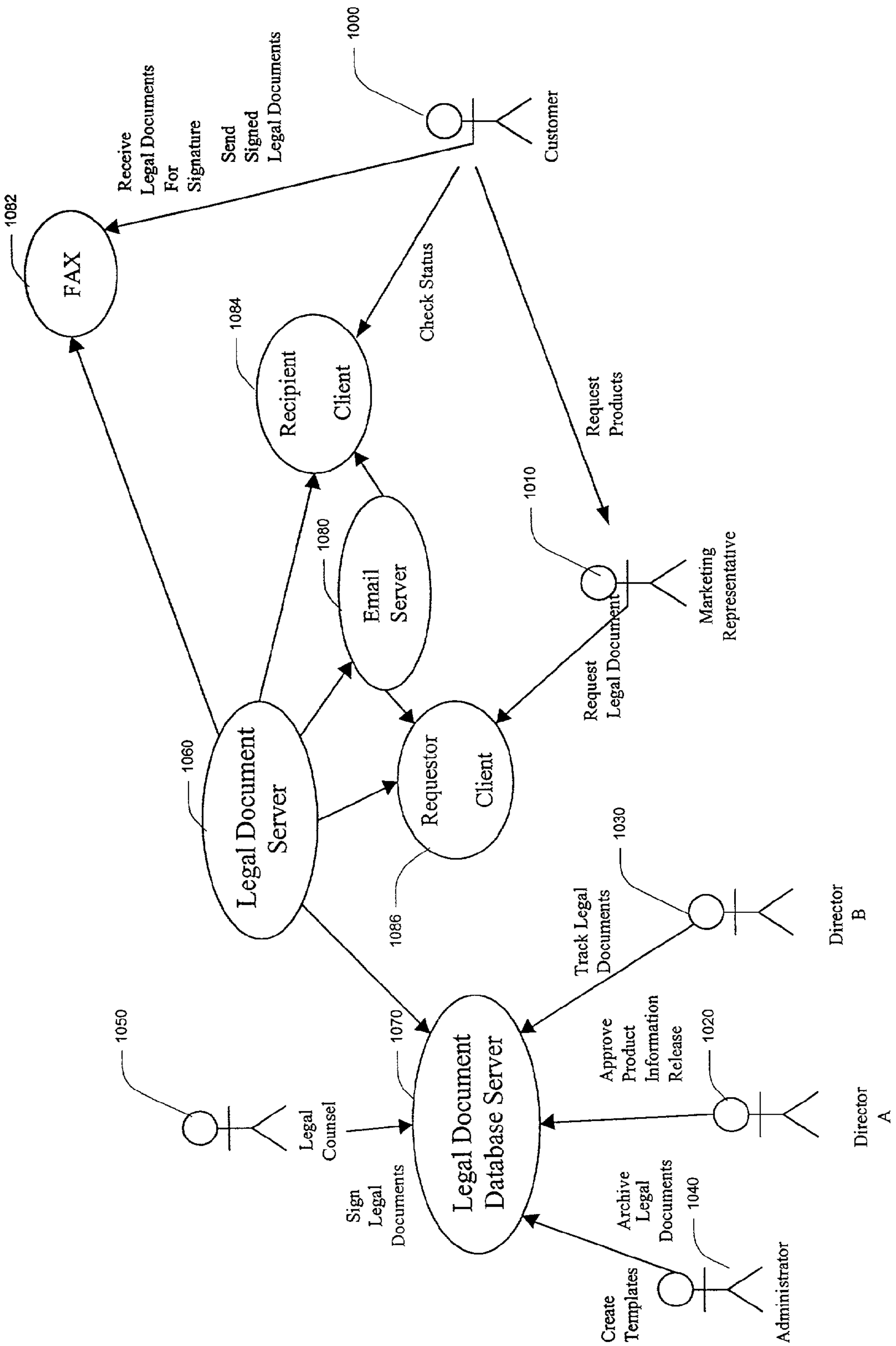
FIG. 1 is a use case diagram of an embodiment of the invention.

FIG. 1 is a use case diagram of an embodiment of the invention for preparation of NDAs. The preparation of an NDA requires the coordination of a customer 1000, a marketing representative 1010 such as a sales person, a plurality of directors as exemplified by directors A 1020 and B 1030, an administrator 1040, and legal counsel 1050. The marketing representative acts as a liaison between the product managers and directors to procure computer chip samples and specifications for the customer. The computer chip samples and the specifications are preferably protected from disclosure by the customer through the use of a NDA. The legal counsel ensures that a NDA is in place before the customer receives the computer chip samples or the specifications. The administrator is charged with holding and tracking the NDAs once the NDAs are in place.

The described embodiment of the present invention enables the efficient creation, tracking, version control, and amendment of NDAs through the use of a network of computers. Services supplied by the network are coordinated through a legal document server 1060. The legal document server is extended through the use of a legal document database server 1070. The legal document database server provides database services for the storage and retrieval of legal documents such as NDAs.

The services of the legal document server are further extended by an email server 1080. The email server provides services to send email messages by the legal document server to the customer, marketing representatives, directors, administrators, and legal counsel. A single email server is shown for clarity and the use of a single email server is not intended as a limitation of the invention.

The services of the legal document server are further extended by a facsimile (FAX) service. The legal document server uses FAX services to both send and receive legal documents to and from customers.

The user interfaces for the services of the legal document server are implemented using a client/server architecture. The legal document server serves documents written in a document markup language such as Hyper Text Markup Language (HTML) for display and interaction using a client such as a Web browser. Marketing representatives communicate with the legal document server using a requester client 1086. Customers communicate with the legal document server using a Recipient client 1086. Additionally, the requester client and the Recipient client may be used to access the email server. Those skilled in the art of computer science will recognize that different methods and clients may be used to access the email server and access by a particular kind of client is not a limitation of the present invention.

In operation, an administrator under the direction of legal counsel prepares templates used by the legal document server to create legal document templates. These legal document templates are stored by the legal document database server in a legal document database. The legal document templates are customized with customer identification data and specific subject matter information by the legal document server to create legal documents.

The customer contacts the marketing representative and makes a product request. The marketing representative uses the requestor client to send a legal document request to the legal document server. The legal document request includes information about the customer identification and specific product subject matter as requested by the customer.

Individuals responsible for the generation, approval, and tracking of legal documents, such as the administrator, directors, and legal counsel, use the extended services of the legal document server to control the legal document creation and approval process. For example, directors establish the business rules by which and for whom a legal document can be produced; the directors also review the legal document request for technical accuracy and actual availability for each subject matter product in their domain; and the legal counsel approves the legal content of the legal document. The legal document server also provides services to track legal documents once the legal documents are issued to the customer.

The legal document server provides services to customers and marketing representatives to track the approval status of a legal document awaiting approval from directors. Customers use the previously described Recipient client to access the legal document server to determine the approval status of a legal document.

Figure 2:
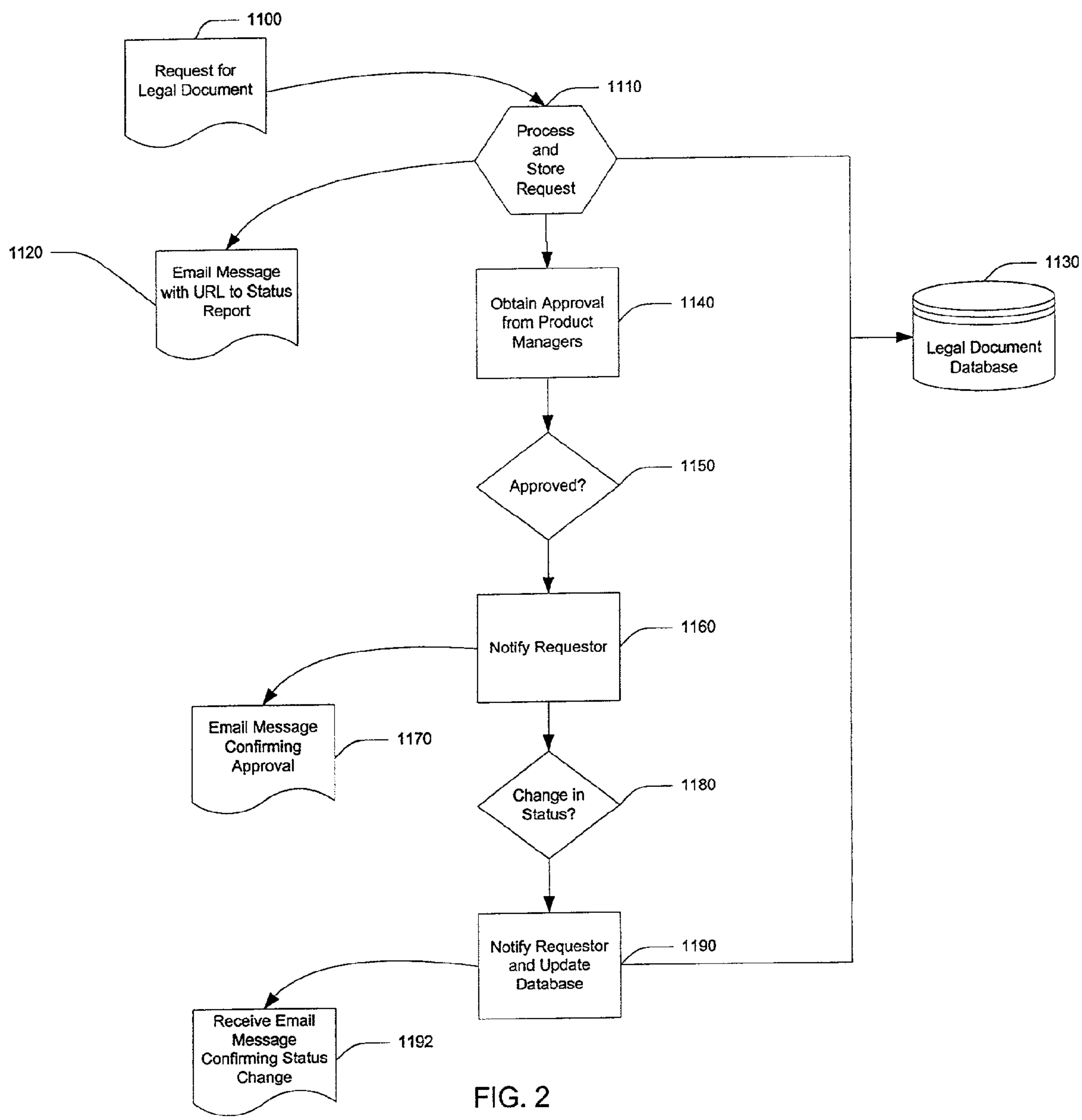
FIG. 2 is a process flow diagram of an embodiment of the present invention wherein a customer requests a legal document.

FIG. 2 is a process flow diagram of an embodiment of the present invention wherein a customer requests a legal document. A marketing representative sends a request for a legal document 1100 to the legal document server. The request includes data identifying a customer and an indication of the subject matter. For example, a customer identification includes the name of a corporation and the name of an executive capable of binding the corporation in a legal relationship. The subject matter information includes the name or model number of a computer chip or computer chip family and a list of specifications to be covered by a NDA.

The legal document server receives the legal document request and begins to process the request 1110. A request can be processed by generating a legal document using the information contained in the request.

In one embodiment, business and legal rules are determined by templates containing the "boilerplate" provisions of the legal document. These templates are stored in legal document database 1130. An initial legal document can be generated using a template and the initial legal document can be stored in the legal document database for further processing.

The processing of the legal document continues through obtaining approvals 1140 from the appropriate directors. In one embodiment of the present invention, the requestor is notified by sending a confirmation 1170 that the legal document is ready once the legal document is approved 1150.

In one embodiment of the present invention, the legal document is retained in the legal document database for status reporting and possible amendment. For example, a customer reviewing a computer chip and its specifications under a NDA may desire to obtain other computer chips. In this case, a new NDA is not generated. An amendment to the original NDA is generated and sent the customer for execution. The need for an amendment is detected when there is a change in status 1180 of the legal document. In which case, an amendment is generated 1190, the legal document database is updated, and the requester is notified by a confirmation 1192 of the availability of the amendment.

In one embodiment of the present invention, the status of a legal document awaiting approval may be checked by the requester through the services of the legal document server. An address identifying the location of an approval status document is sent to the requester in an initial confirmation message 1120. The requester uses the address of the approval status document to retrieve a approval status document that is updated by the legal document server as the legal document moves through the approval process.

In one embodiment of the legal document server, a confirmation notice is sent to the approving directors when the NDA is transmitted to the customer.

Figure 3A:
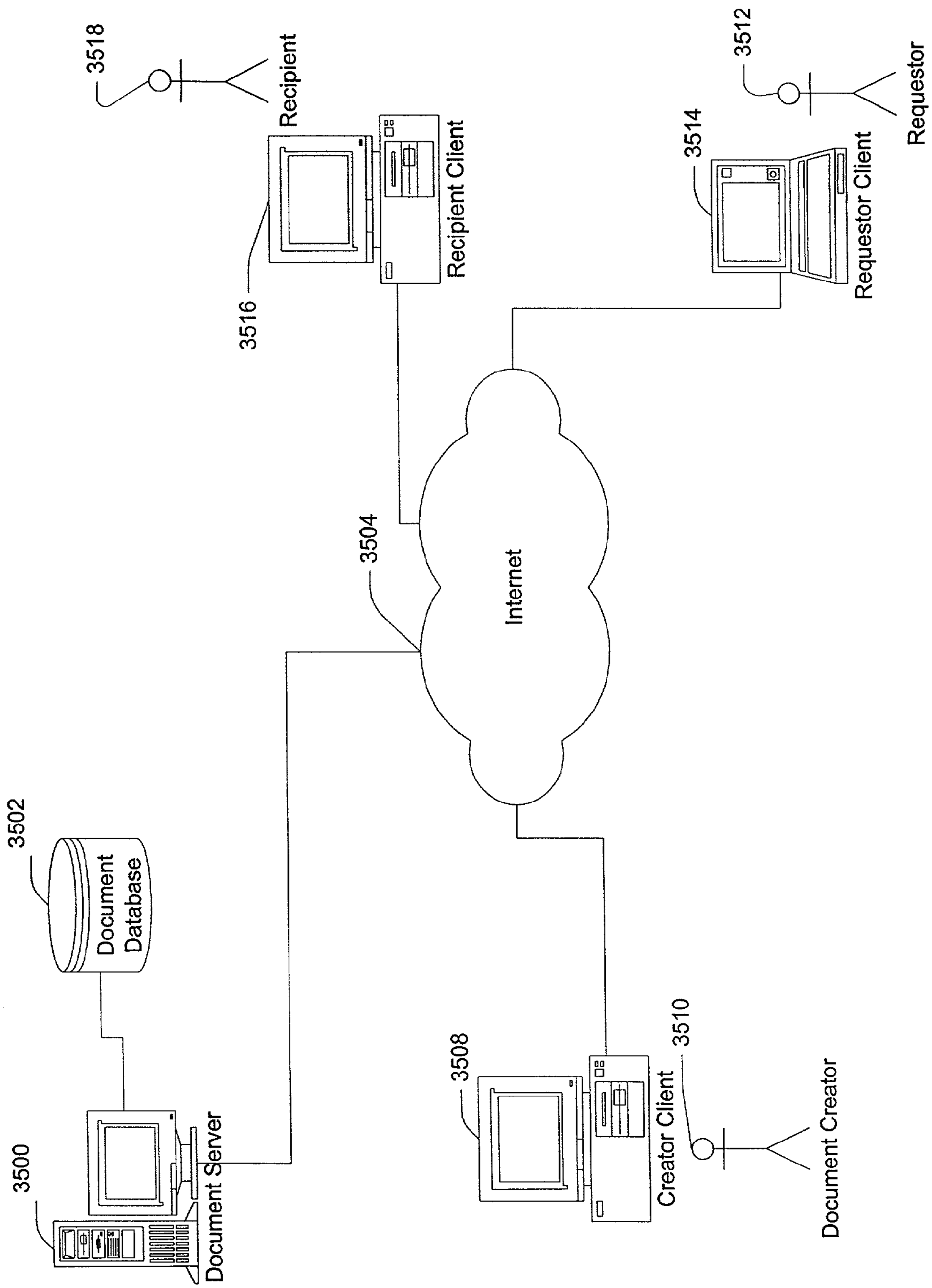
FIG. 3*a* is a deployment diagram of an embodiment of the present invention.

FIG. 3*a* is a schematic depicting one embodiment of the present invention. A document server 3500 is operably coupled to the Internet 3504 via a communications link adapted for communications using Hyper Text Transfer Protocol (HTTP). The document server is also operably coupled to a document database 3502 for storage of documents for tracing, reporting, and modification purposes.

A document creator 3510 uses a creator client 3508 operably coupled to the document server via the Internet to specify and create document generation instructions used by the document server to generate documents. A requester 3512 uses a requester client 3514 operably coupled to the document server via the Internet to transmit document requests to the document server. A document request may include recipient information about intended document recipient 3518 and subject matter information.

The document server receives the document request and uses the recipient and subject matter information in the document request combined with the document generation instructions provided by the document creator to generate a document for receipt by the recipient. The document server saves a copy of the document in the document database and sends the document to the recipient. The recipient may receive the document from the document server by using a recipient client 3516 operably coupled to the Internet.

In one embodiment of the present invention, the document server uses the document database to generate document version control and document tracking services accessed by the document creator using the creator client. For example, the document creator may use the document client to request a report showing the number and nature of the documents held by the recipient. In this case, the document server accepts a report request, formats the request into a database query, and gets data describing the number and nature of the documents held by the recipient. The document server formats the data into a Web page that is then sent to the document client for display and viewing by the document creator.

In one embodiment of the present invention, different versions of the legal document template are stored in the legal document database and each of these versions are available for review or use by a requester. In this way, a requester may maintain consistency of communications with an existing customer.

In another embodiment of the present invention, the document server and document database may be used to generate modified documents for transmission to the recipient. In this case, the requester transmits a document modification request to the document server. The document modification request may include the identification of a document originally stored in the document database and new subject matter information. The document server uses the document identification to retrieve the stored document. The document server creates a modified document using the new subject matter information and the retrieved document. The document server then transmits the modified document to the recipient of the original stored document.

Figure 3B:
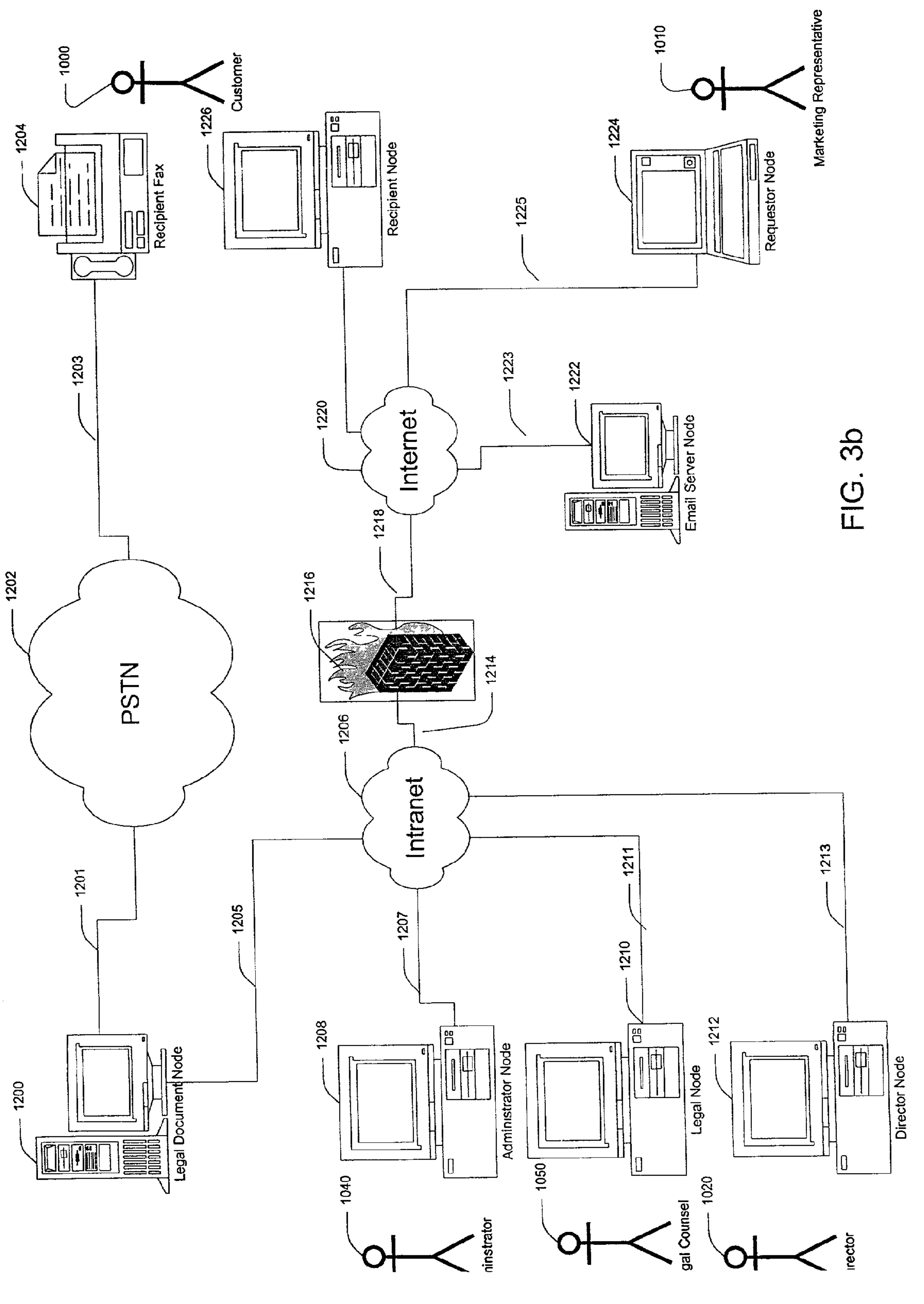
FIG. 3*b* is a deployment diagram of another embodiment of the present invention.
Figure 4:
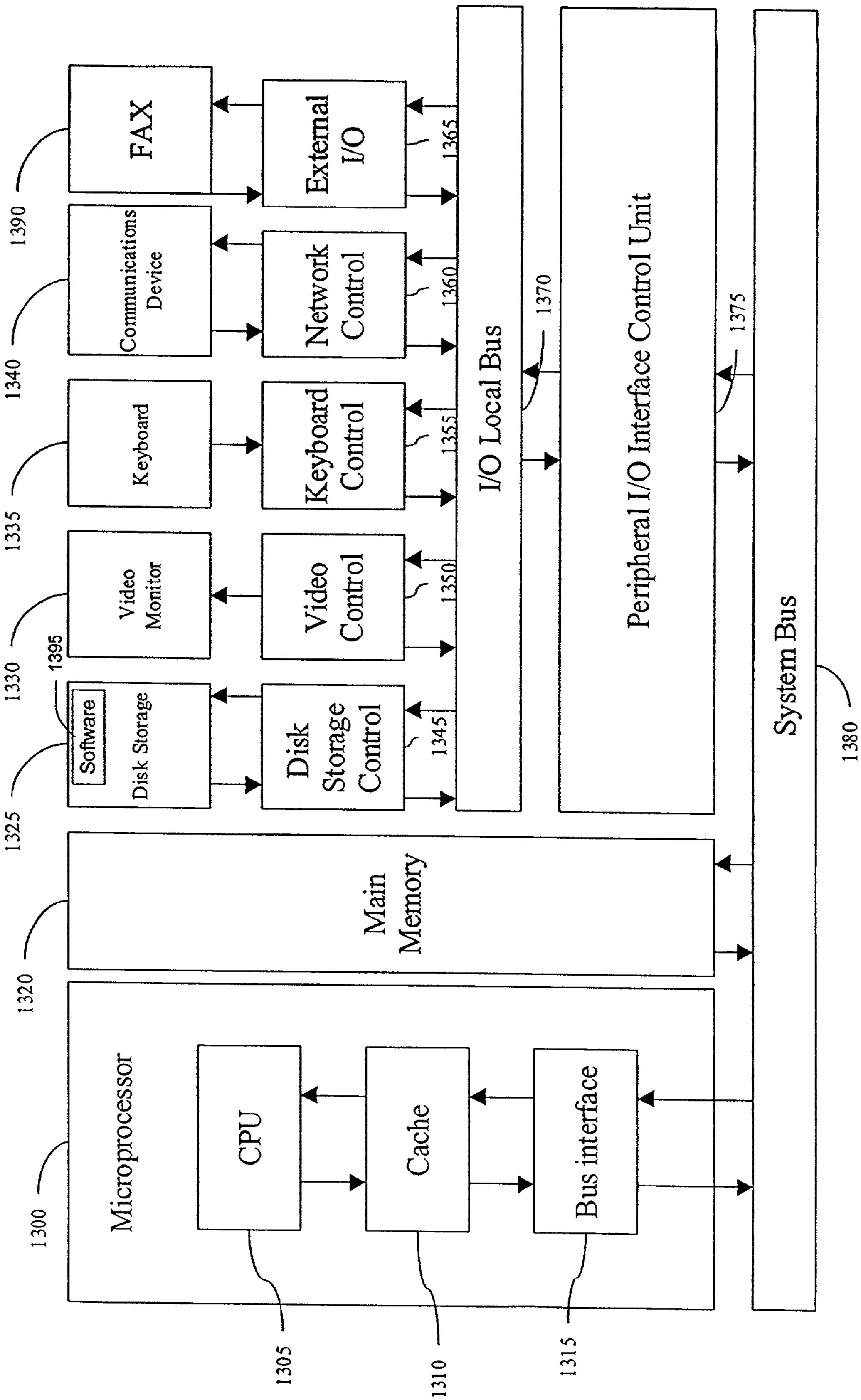
FIG. 4 is a computer architecture diagram of an embodiment of a node suitable for use in one embodiment of the invention.

FIG. 3*b* is a deployment diagram depicting the relationships between computer nodes and hardware useful in implementing an exemplary embodiment of the present invention. The computer nodes comprise a network of linked computer systems adapted to generate and transmit documents according to the present invention. A legal document node 1200 can be operably coupled through telephone communications link 1201 to the Public Switched Telephone Network 1202. FIG. 4 is a computer architecture diagram of an exemplary general purpose computer suitable for use as a node as depicted in the deployment diagram of FIG. 3*b* and as a document server as depicted in FIG. 3*a*. A microprocessor 1300, comprised of a Central Processing Unit (CPU) 1305, a memory cache 1310, and a bus interface 1315, can be operatively coupled via a system bus 1380 to a main memory 1320 and an Input/Output (I/O) interface control unit 1375. The I/O interface control unit can be operatively coupled via an I/O local bus 1370 to a disk storage controller 1345, a video controller 1350, a keyboard controller 1355, a network controller 1360, and I/O expansion slot 1365. The disk storage controller can be operatively coupled to a disk storage device 1325. The video controller can be operatively coupled to a video monitor 1330. The keyboard controller can be operatively coupled to a keyboard 1335. The network controller can be operatively coupled to a communications device 1340 preferably adapted for computer network communications services. A FAX communications device 1290 can be operatively coupled to the I/O expansion slot for facsimile transmissions.

In operation, computer program instructions 1395 implementing a software object are preferably stored on the disk storage device until the microprocessor retrieves the computer program instructions and stores the computer program instructions in the main memory. The microprocessor then executes the computer program instructions stored in the main memory to implement the software object.

Referring again to the exemplary embodiment depicted in FIG. 3, the telephone communications link 1201 is preferably adapted for communications using facsimile transmission protocols such as recommended in International Telecommunication Union (ITU) publication T.30. A facsimile terminal 1204 can be operably coupled to the PSTN via terminal communications link 1203. The terminal communications link is preferably adapted for communications using facsimile transmission protocols such as recommended in ITU publication T.30. In operation, the legal document node sends legal documents in the form of facsimile transmissions to the facsimile terminal for use by a customer 1000. The customer may also send facsimile transmissions from the facsimile terminal through the PSTN to the legal document node.

The legal document node can be operably coupled via legal document communications link 1205 to an Intranet 1206. The legal document communications link is preferably adapted for communications using the Transmission Control Protocol/Internet Protocol (TCP/IP) suite of networking protocols such as Hyper Text Transfer Protocol (HTTP) for hypertext document transfer and Simple Mail Transfer Protocol (SMTP) for the transfer of electronic (email) messages.

The Intranet provides communication links for a plurality nodes used by legal document administrators for accessing the legal document node. An administrator node 1208 can be operably coupled to the Intranet via executive communications link 1207. The executive communications link is preferably adapted for communications using the TCP/IP suite of networking protocols such as HTTP and SMTP. In operation, a administrator 1040 uses the executive node to the access the legal document node via the Intranet.

A legal node 1210 can be operably coupled to the Intranet via legal communications link 1211. The legal communications link is preferably adapted for communications using the TCP/IP suite of networking protocols such as HTTP and SMTP. In operation, legal counsel 1050 uses the legal node to the access the legal document node via the Intranet.

A director node 1212 can be operably coupled to the Intranet via director communications link 1213. The director communications link is preferably adapted for communications using the TCP/IP suite of networking protocols such as HTTP and SMTP. In operation, a director 1020 uses the director node to the access the legal document node via the Intranet.

The Intranet can be operably coupled via external Intranet communications link 1214 and 1218, through firewall 1216 to the Internet 1220. The external Intranet communications link is preferably adapted for communications using the TCP/IP suite of networking protocols such as HTTP and SMTP. In operation, the legal document node, the administrator node, the legal node, and the director node all reach the Internet through the Intranet and the firewall.

A requestor node 1224 can be operably coupled to the Internet via requester communications link 1225. The requester communications link is preferably adapted for communications using the TCP/IP suite of networking protocols such as HTTP and SMTP. In operation, a marketing representative 1010 uses the requester node to the access the services of the legal document node via the Internet.

An email server node 1222 can be operably coupled to the Internet via email server communications link 1223. The email server communications link is preferably adapted for communications using the TCP/IP suite of networking protocols such as SMTP and Post Office Protocol (POP). In operation, the email server can be reached via the Internet by the legal document node, the Recipient node, the requester node, the executive node, the legal node, and the director node. The email server provides email services for sending email messages between the legal document node, the customer, the marketing representative, the administrator, legal counsel, and directors.

Figure 5:
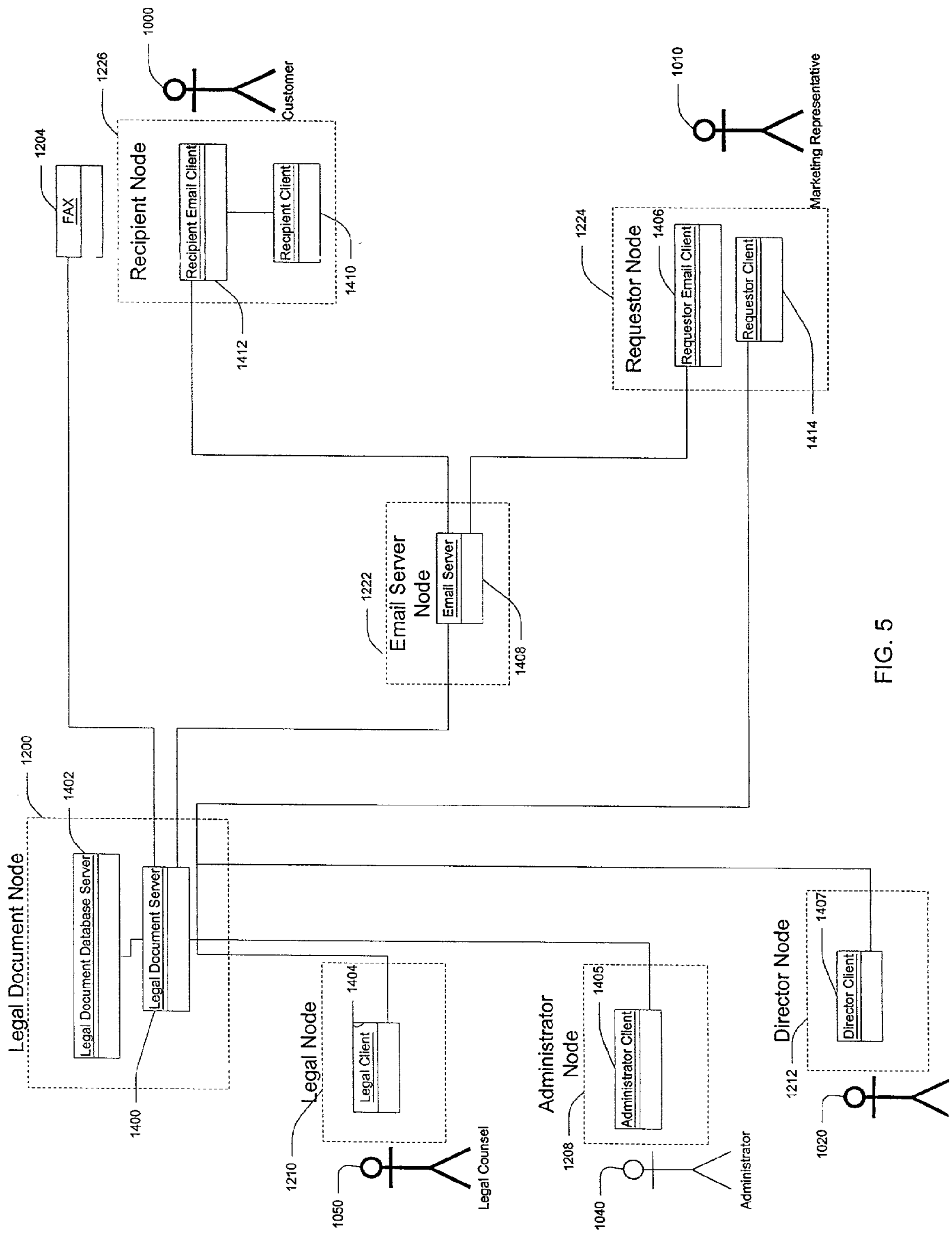
FIG. 5 is a sequence diagram of an embodiment of a process for requesting and generating a legal document according to the present invention.

FIG. 5 is a collaboration diagram illustrating exemplary logical connections between software objects used in an embodiment of the present invention. A legal document server 1400, hosted by a legal document node 1200, can be operatively coupled to a legal document database server 1402. The legal document server uses the services of the legal document database server to put and get legal document templates and working legal documents. One embodiment of a legal document server uses the legal document database server to get information used to generate status reports on working legal documents. Although depicted as being hosted by the legal document node, the legal document database server may be hosted by any node accessible to the legal document server. Furthermore, any number of legal document database servers may be accessed as needed by the legal document server. Alternatively, the legal document server may maintain a file system where the legal documents are stored.

The legal document server can be accessed by directors, legal counsel, and administrators. A legal client 1404, hosted by legal node 1210, can be operably coupled to the legal document server. The legal client can be used by legal counsel 1050 to access the services of the legal document server. A director client 1407, hosted by director node 1212, can be operably coupled to the legal document server. The director client can be used by director 1020 to access the services of the legal document server. An administrator client 1405, hosted by administrator node 1208, can be operably coupled to the legal document server. The administrator client can be used by administrator 1040 to access the services of the legal document server.

A requester client 1414, hosted by requester node 1224, can be operably coupled to the legal document server. The requester client can be used by a legal document requester to access the services of the legal document server. An exemplary legal document requestor is shown as marketing representative 1050.

A requester email client 1406, hosted by the requester node, can be used by a requester to send and receive email messages. Although the requester client and the requester email client are shown as being hosted at the same node, this is not to be considered a limitation of the present invention as the requester email client and requester client could be hosted on separate nodes. The two requester clients are shown as being hosted at the same node for exemplary purposes only.

A recipient email client 1412, hosted by recipient node 1226, can be operably coupled to a recipient client 1410. The recipient email client invokes the recipient client to display and print email attachments attached to email messages retrieved from an email server. Although the recipient client and the recipient email client are shown as being hosted at the same node, this is not to be considered a limitation of the present invention as the recipient email client and recipient client could be hosted on separate nodes. The two recipient clients are shown as being hosted at the same node for exemplary purposes only.

An email server 1408, hosted by email server node 1222, can be operably coupled to a requestor email client 1406, the recipient email client, and the legal document server. As previously noted, only a single email server is shown for exemplary purposes. The email server accepts and holds email messages exchanged between legal counsel, the marketing representative, and the customer.

In operation, a legal document requester, such as the marketing representative, uses the requester client to access the services of the legal document server. The legal document server accepts the legal document request and coordinates the generation of the requested legal document. The legal document server maintains and accesses a database of legal document templates and working legal documents using the services of the legal document database server.

In one embodiment, version control of the legal documents is maintained using the services of the legal document server. For example, legal counsel may decide that a particular document's terms need to be modified in light of changed business goals. In this case, the legal counsel retrieves a legal document template from the legal document database and makes the necessary modifications. The legal document template is restored in the legal document database. Each time a requester makes a new request for a legal document, the requester gets the newest version of the legal document that accurately reflects the new business goals of the legal document creator supplying the legal document. In this way, old versions of legal documents are not maintained by requesters and modified without the approval of the legal document's creator.

In some instances, a legal document may require approvals from directors or legal counsel before the legal document can be generated. In this case, one embodiment of the present invention provides for an approval status document to be created and maintained by the legal document server. The approval status document can be accessed by the legal document requester using the requester client to monitor the status of the pending approvals.

In one embodiment, a legal document server generates the requested legal document and awaits further processing instructions by the requester. The requestor determines how the requested legal document should be sent to the recipient. For example, the requested legal document can be sent to the recipient via facsimile transmission. In this case, the recipient receives the requested legal document, executes the requested legal document by signing the requested legal document, and sends the signed requested legal document back to the legal document database server by facsimile transmission.

In one embodiment of the present invention, the requested legal document can be sent to the recipient as an attachment to an email message. In this embodiment, the recipient uses the recipient email client to receive the email message and uses the recipient client to display and print out the requested legal document for execution. The printed requested legal document can be signed and sent back to the legal document server via facsimile transmission.

In one embodiment of the present invention, the requested legal document can be transmitted to the recipient as an electronic document via the email server and the recipient email client. The recipient electronically signs the electronic document by attaching a digital signature and sends the digitally signed electronic document to the legal document server via the email server.

In one embodiment of the present invention, the legal document server notifies directors, administrators, and legal counsel of the transmission of legal documents to a recipient using via the email server.

In one embodiment of the invention, the legal document server maintains a database of working legal documents for tracking purposes. A legal document administrator accesses the legal document server using the administrator client to obtain a legal document status report. The legal document server uses the database of working legal documents to generate the status report that can be sent to a director, legal counsel, or an administrator.

Figure 6:
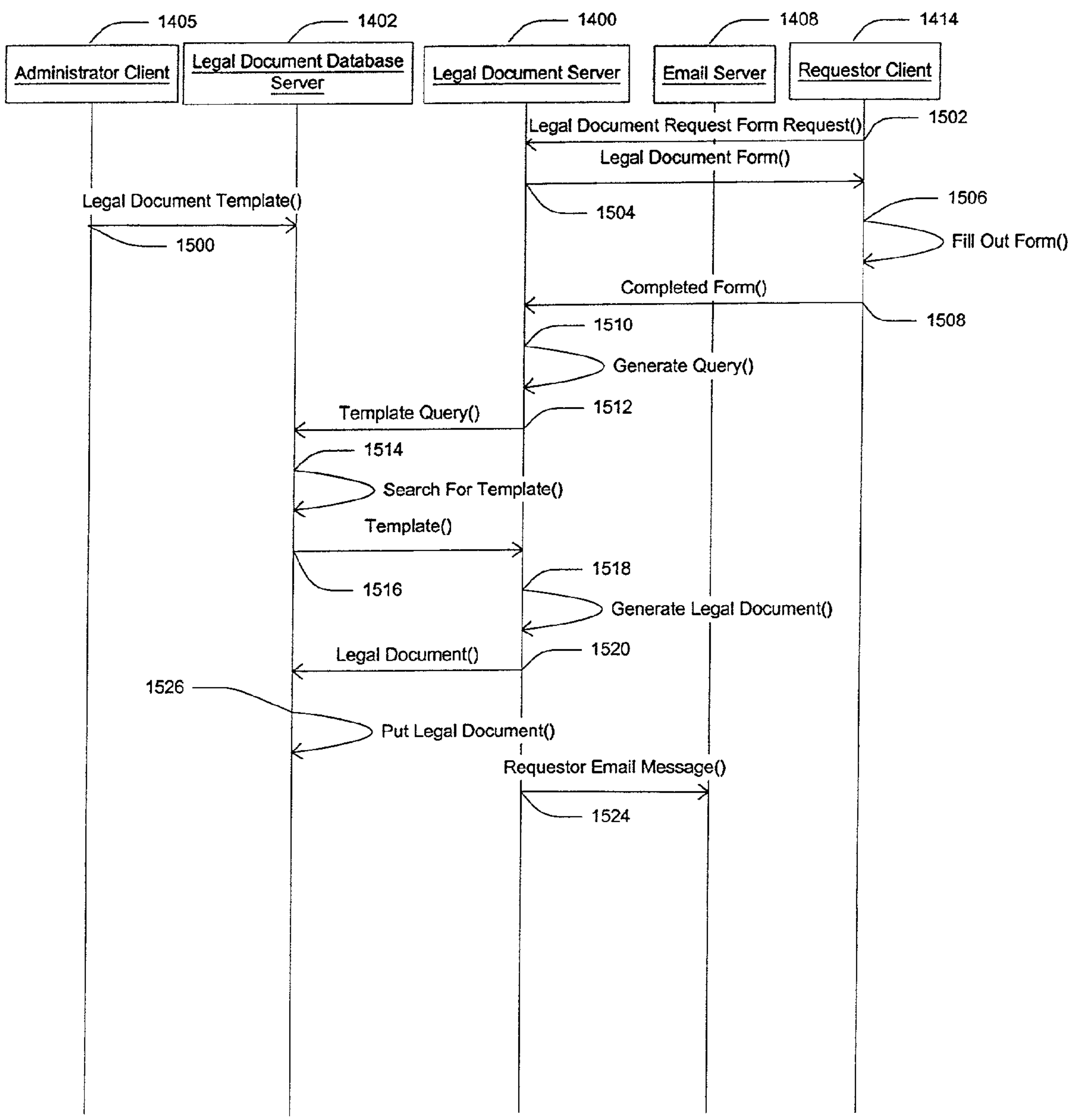
FIG. 6 is a sequence diagram of an embodiment of a process for providing an approval status report according to the present invention.

FIG. 6 is a sequence diagram of a sequence of communications exchanged while requesting and generating a legal document between an embodiment of the software objects of FIG. 5. An administrator uses an administrator client 1405 to put a legal document template 1500 in a database using a legal document database server 1402. The legal document template contains an embodiment of the legal and business rules to be implemented by the legal document server when generating a legal document. In one embodiment, the rules are embodied as document generation instructions. In another embodiment, the rules are embodied in the content and format of the legal document template.

A requester, such as a marketing representative, obtains a legal document request form 1504 in response to a request for a legal document request form 1502. The requester fills out the legal document request form 1506. The legal document request form includes fields for entry of recipient and subject matter information. The completed legal document request form 1508 can be then transmitted to the legal document server.

The legal document server processes the legal document request form by generating 1510 a query for the legal document database server in order to find a suitable template for generating a legal document according to the information contained in the legal document request. A template query 1512 can be sent to the legal document database server and the legal document database server searches 1514 for the correct legal document template. A legal document template 1516 can be returned to the legal document server.

The legal document server uses the legal document template to generate a legal document 1518 according to the recipient and subject matter information contained in the legal document request. In one embodiment, the template contains the standard language used for the type of legal document requested. The appropriate subject matter and recipient information are inserted into the legal document template to generate the legal document. In this embodiment, the legal and business rules used to control the generation of the legal document are contained in the content and format of the legal document template. Alternatively, the legal document template contains instructions used to generate the legal document according to the recipient and subject matter information contained in the legal document request. In this embodiment, the legal and business rules used to generate the legal document are contained in the legal document generation instructions. The legal document server puts the completed legal document 1520 into the working legal document database using the services of the legal document database server.

The legal document server sends a legal document generation notification in a requester email message 1524 intended for the requestor. The requestor email message can be sent to the email server where it can be held until a requester retrieves the requester email message. The requester email message includes information about the recipient and subject matter of the legal document and informs the requester that the requested legal document has been generated and is ready for transmittal to the recipient. The requestor email message further includes legal document transmittal instructions.

In one embodiment of the invention, the legal document server provides an approval status report contained in a legal status document during the time that the legal document server is generating a requested legal document. Generation of the legal document may be time consuming because several legal document administrators may need to approve the legal document before the legal document can be generated. In this case, the requester of the legal document can monitor the progress of the approval sequence by accessing and viewing the approval status document.

Referring again to FIG. 2, in one embodiment of the invention, a legal document server sends an email message 1120 to the legal document requestor acknowledging receipt of a legal document request. Included in this acknowledgment can be a Uniform Resource Locator (URL) pointing to a location on the Internet of an approval status report generated by the legal document server. A requester uses the URL to access the approval status report via the Internet. In this way, the requestor can keep the recipient apprized of the progress of the legal document generation process.

Figure 7:
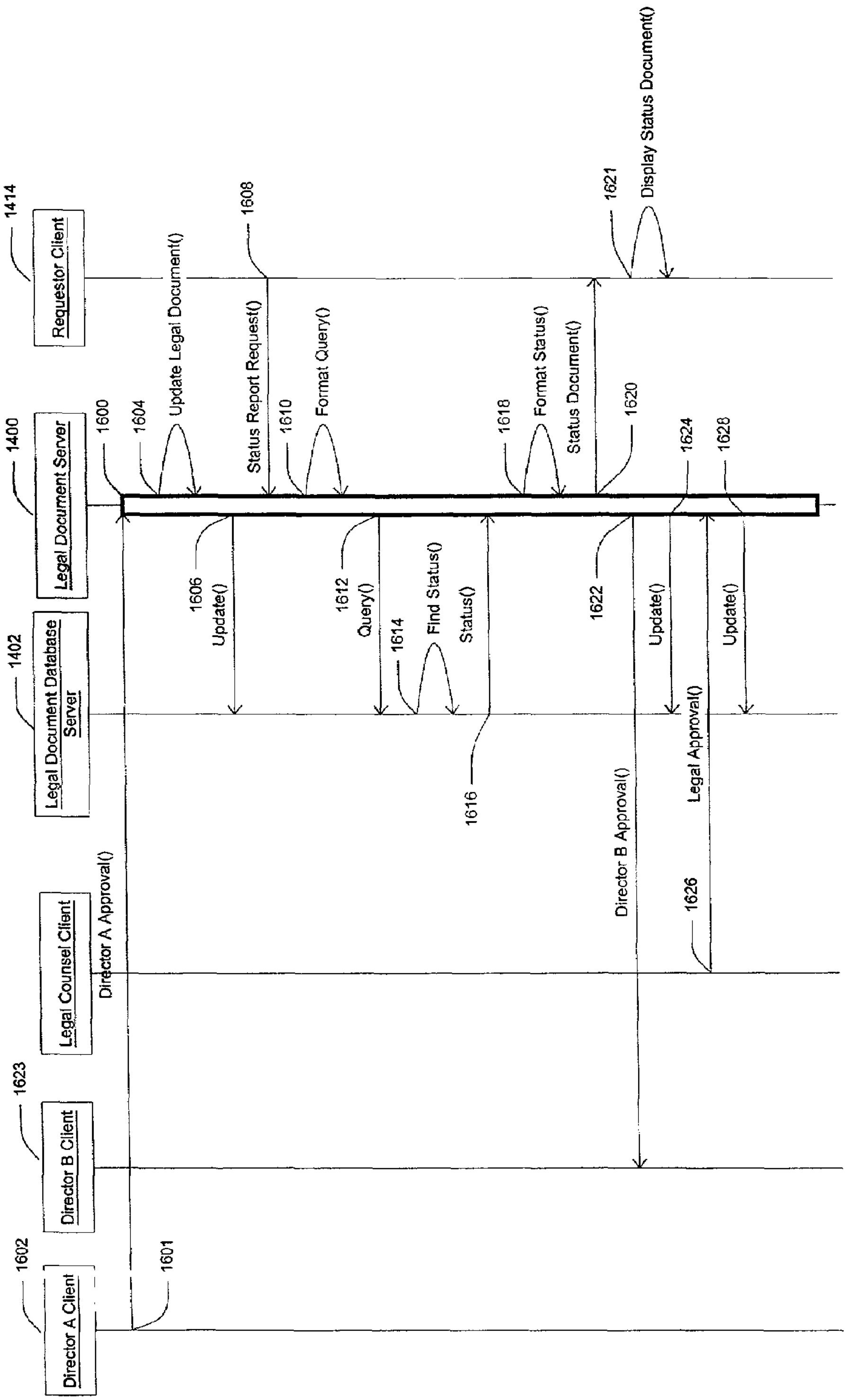
FIG. 7 is a diagram of the methods for generating and sending a legal document according to the present invention.

FIG. 7 is a sequence diagram of an embodiment of a process for providing an approval status report according to the present invention. A legal document server begins the process of generating a legal document 1600. In this example, the generation of the legal document requires approval from two directors, director A and director B. Director A evaluates the request and approves the legal document generation by sending a director A approval 1601 to the legal document server using a director A client 1602. The legal document server updates the legal document in progress 1604 and puts the updated status of the legal document in progress into a database maintained by a legal document database server 1402.

A requestor uses a requester client 1414 to send a status report request 1608 using the previously described approval status report URL. The legal document server receives the request and formats 1610 a query for the legal document database server based on the approval status report request. A query 1612 can be sent to the legal document database server where it can be used to find 1614 the status of the legal document in progress. The status 1616 can be sent to the legal document server where it can be used to format 1618 an approval status report document 1620 suitable for transmission to and display by 1621 the requester client. In one embodiment, the approval status report document can be written in a markup language such as HTML and transmitted as a Web page.

The processing of the legal document in progress continues as the director B approval 1622 is received from director B using a director B client 1623. The legal document server sends an update 1624 to the legal document database server so that the next request for an approval status report from the requester can be properly processed. In a similar manner, a legal approval 1626 sent by legal counsel using a legal counsel client 1627 triggers the legal document server to send an update 1628 to the legal document database server.

Figure 8:
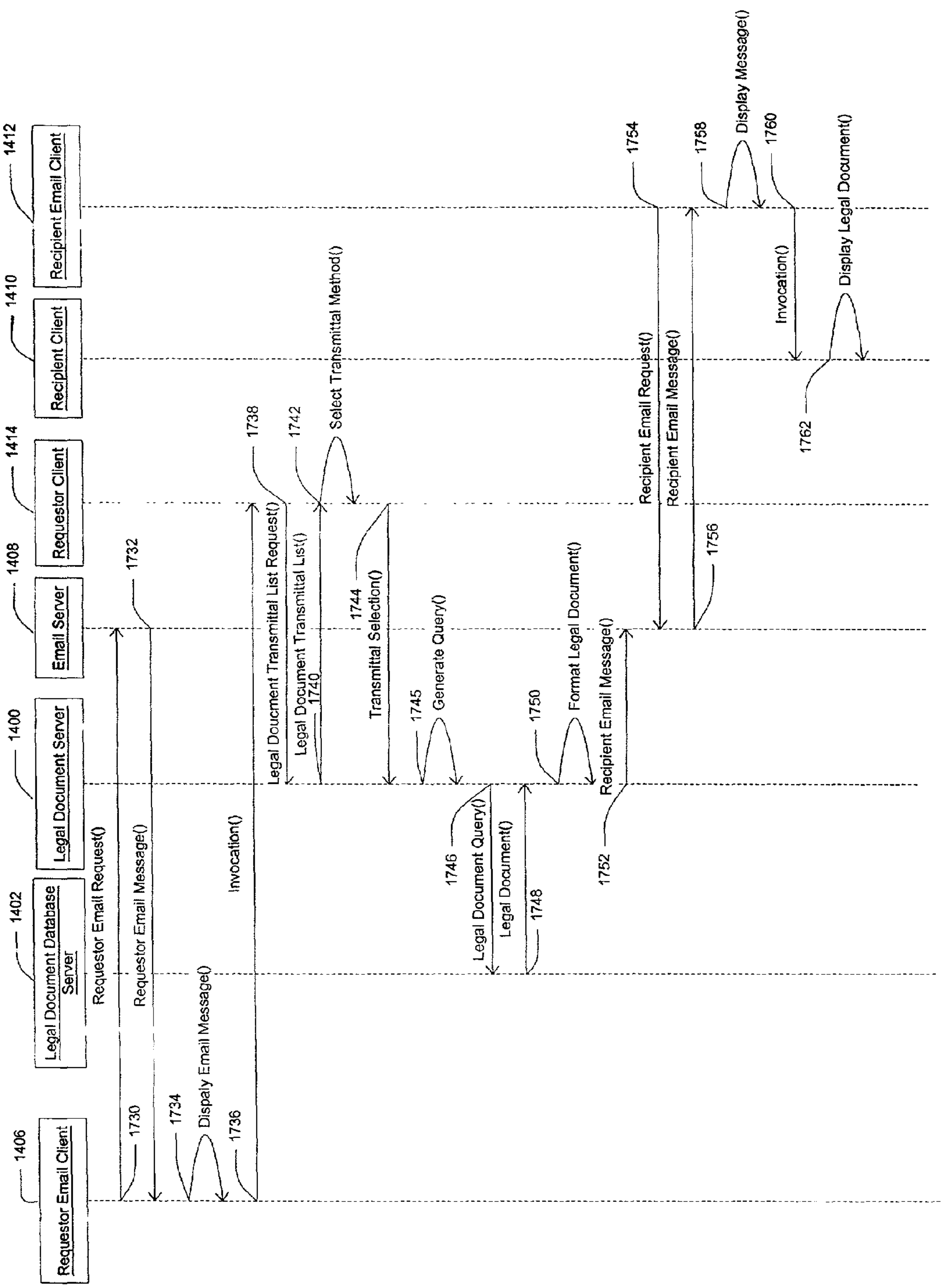
FIG. 8 is an home Web page for an embodiment of the present invention.

FIG. 8 is a sequence diagram depicting reception of a legal document by the recipient. As previously described, a legal document server 1400 sends a requester email message to a requestor when a requested legal document has been generated. The requestor uses a requester email client 1406 to send a requester email request 1730 to the email server 1408. The email server sends the requester email message 1732 to the requester email client in response to the requester email request. The requester email client displays 1734 the requester email message for the requester. In one embodiment, the requester email message further includes a hypertext link in the form of a URL. Selection of the hypertext link sends an invocation 1736 to a requester client 1414 capable of using the URL, such as a Web browser, to locate a legal document transmittal list maintained by the legal document server.

The legal document transmittal list contains selectable transmittal options for transmitting the legal document to a recipient. The requester client sends a legal document transmittal list request 1738 to the legal document server using the information contained in the URL. The legal document server sends a legal document transmittal list 1742 to the requester client. The requester client displays the legal document transmittal list and the requester selects 1742 a transmittal method from the list. The requester client sends the transmittal selection 1744 to the legal document server.

The legal document server uses the transmittal selection to generate 1745 a legal document query 1746 for a legal document database server 1402. The legal document server sends the legal document query to the legal document database server and the legal document database server sends a legal document 1748 satisfying the legal document query to the legal document server. The legal document server takes the legal document and formats 1750 the legal document into a form suitable for transmitting to the recipient.

In one embodiment of the present invention, the legal document can be formatted into an electronic document suitable for attachment to a recipient email message 1752 to be sent to a recipient. Included in the recipient email message are instructions to the recipient on the proper method to execute the legal document and return it to a legal document administrator. The recipient email message can be routed through the email server where it can be held until the recipient sends a recipient email request 1754 to the email server from recipient email client 1412. The recipient email client receives the recipient email message 1756 and displays 1758 the recipient email message to the recipient. The recipient email client sends an invocation 1760 to a recipient client 1410 in order to display 1762 and produce a hard copy of the legal document.

Alternatively, the legal document can be sent by facsimile transmission to the recipient. In this case, the execution instructions are included in a facsimile transmission cover letter.

In another embodiment, the legal document can be sent as an electronic document. The electronic document can be electronically signed by attaching a digital signature to the electronic document and transmitted back to the legal document server.

In one embodiment of the present invention, a legal document server in the form of a Web site can be provided for the generation of NDAs. FIG. 9 is a home Web page for a NDA embodiment of a legal document server. A requestor selects the "Enter ANDA" selection button 1700 to enter the Web site.

Figure 10:
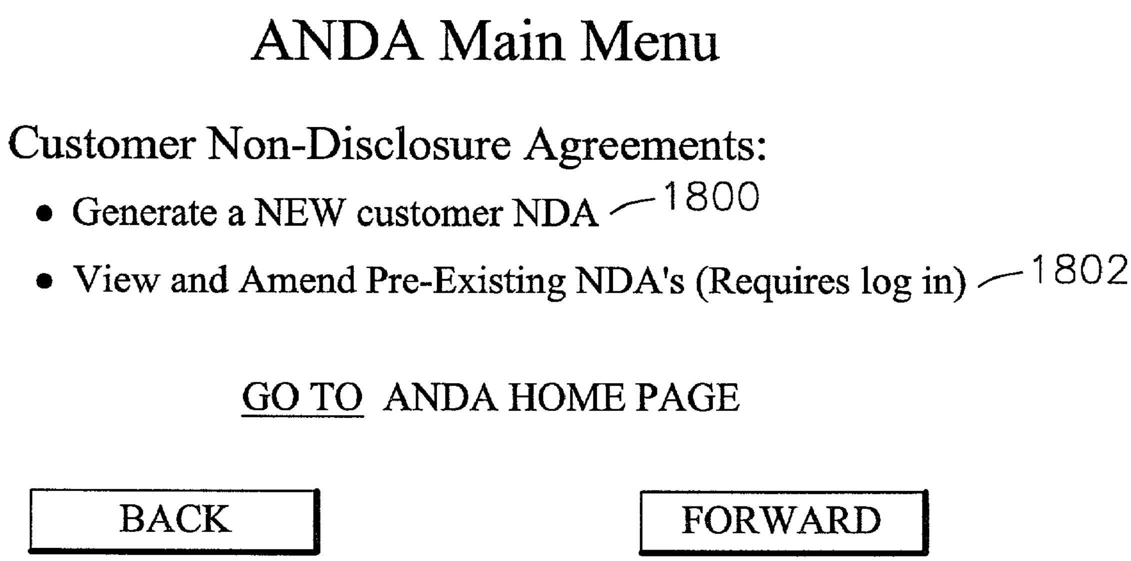
FIG. 10 is a customer identification and subject matter entry form for an embodiment of the present invention.

FIG. 10 is an initial process selection Web page for a NDA embodiment of a legal document server. A requester selects "Generate a NEW customer NDA" 1800 to receive a legal document request form. A requestor selects "View and Amend Pre-Existing NDAs" to track an existing legal document or amend an existing legal document. A requestor selecting "Generate a NEW customer NDA" receives a legal document request form as illustrated in FIG. 11.

Figure 11:
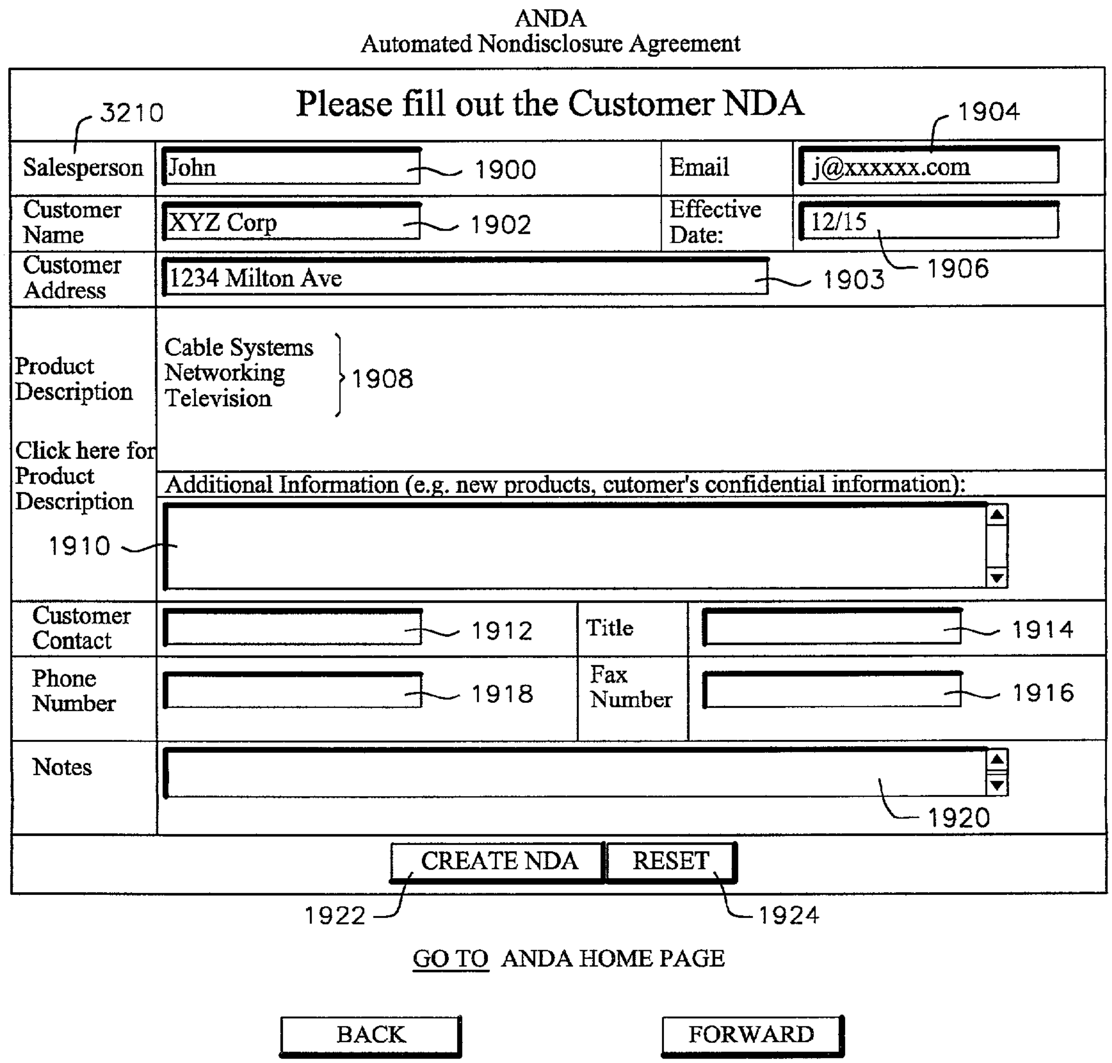
FIG. 11 is a product description of selected subject matter for an embodiment of the present invention.

FIG. 11 is a legal document request form having recipient and subject matter information entry fields from a NDA embodiment of a legal document server. A requester selects a "Reset" button 1924 to clear all data entry fields in the legal document request form. A requestor enters recipient information into the form using customer data entry fields. A customer name field 1902 is for entry of the name of the legal document recipient. A customer address field 1903 is for entry of a mailing address for the recipient. An email field 1904 is for entry of a customer email address. A customer data field 1910 is for free form entry of information about the customer. A customer contact field 1912 is for entry of the name of a person responsible for executing the NDA. A title field 1914 is for entry of the title of the person responsible for execution of the legal document. A phone number field 1918 is for entry of a telephone number of the person responsible for execution of the legal document. A fax number field 1916 is for entry of telephone number by which a facsimile transmission terminal is reached for transmission of the legal document to the person responsible for execution of the legal document.

The legal document request form provides entry fields for subject matter information. An effective date field 1906 is for entry of a date after which the legal document is to be effective if executed by the recipient. A product description field 1908 is for entry of the products for which the recipient is requesting samples of or information about.

The legal document request form provides for the entry of miscellaneous data for the requested legal document. A salesperson field 1900 is for entry of the requestor's name. A notes field 1920 is for entry of notes written by the requester about the legal document request.

A requester selects a "Create NDA" button 1922 to submit the legal document request form to the legal document server.

Selecting "Click here for product description" 1926 requests a Web page from the legal document server describing the subject matter relating to the legal document request form.

Figure 12:
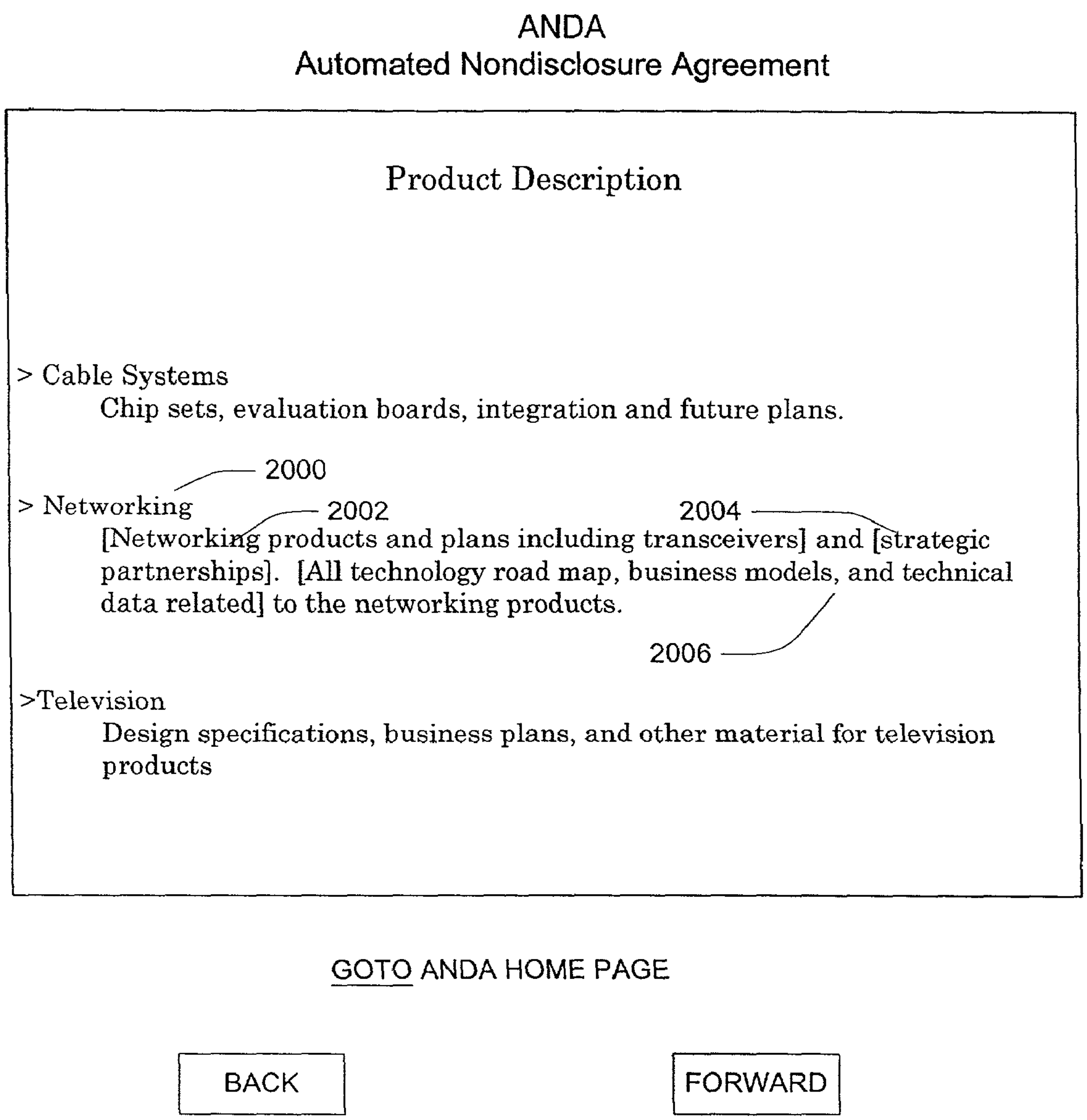
FIG. 12 is a partially filled out customer identification and subject matter entry form for an embodiment of the present invention.

FIG. 12 is a subject matter description of selected products for an embodiment of the present invention. The subject matter of a NDA can range from the physical products provided as samples to the business information applicable to the intended use of the physical products. For example, field 2000 contains information about networking products protected by the NDA. Additionally, protected material includes not only the physical chips 2002, but the relationships between business associates 2004. The information protected by the NDA includes "[a]ll technology road map, business models, and technical data" 2006.

FIG. 13 is an exemplary legal document requestor email message as created by a NDA embodiment of a legal document server. The requestor email message can be sent to the requestor when a legal document server has completed generation of a legal document. The requestor email message includes a synopsis of the previously described recipient information 2200. The requestor email message further includes a synopsis of the previously described subject matter information 2202.

The requestor email message also includes a previously described hypertext link in the form of a URL 2204 for the retrieval of the previously described legal document transmittal instructions. In one embodiment, The URL can be comprised of at least two components. The first component, "http://legal.com/anda/print_help.asp" can be an address of an active server page located on a legal document server. The legal document server uses the instructions in the active server page to dynamically generate a Web page with HTML code containing legal document transmittal instructions. The legal document server sends the Web page back to the requester client for use by the requester. The second component of the URL comprises a NDA identification field, nda_id. The legal document server uses the nda_id field to generate of the previously described legal document query 1746 (FIG. 8). The txt_comp is used to identify the recipient of the generated NDA. The requester selects the hypertext link to invoke a requestor client that retrieves a legal document transmittal selection list in the form of a Web page.

Figure 14:
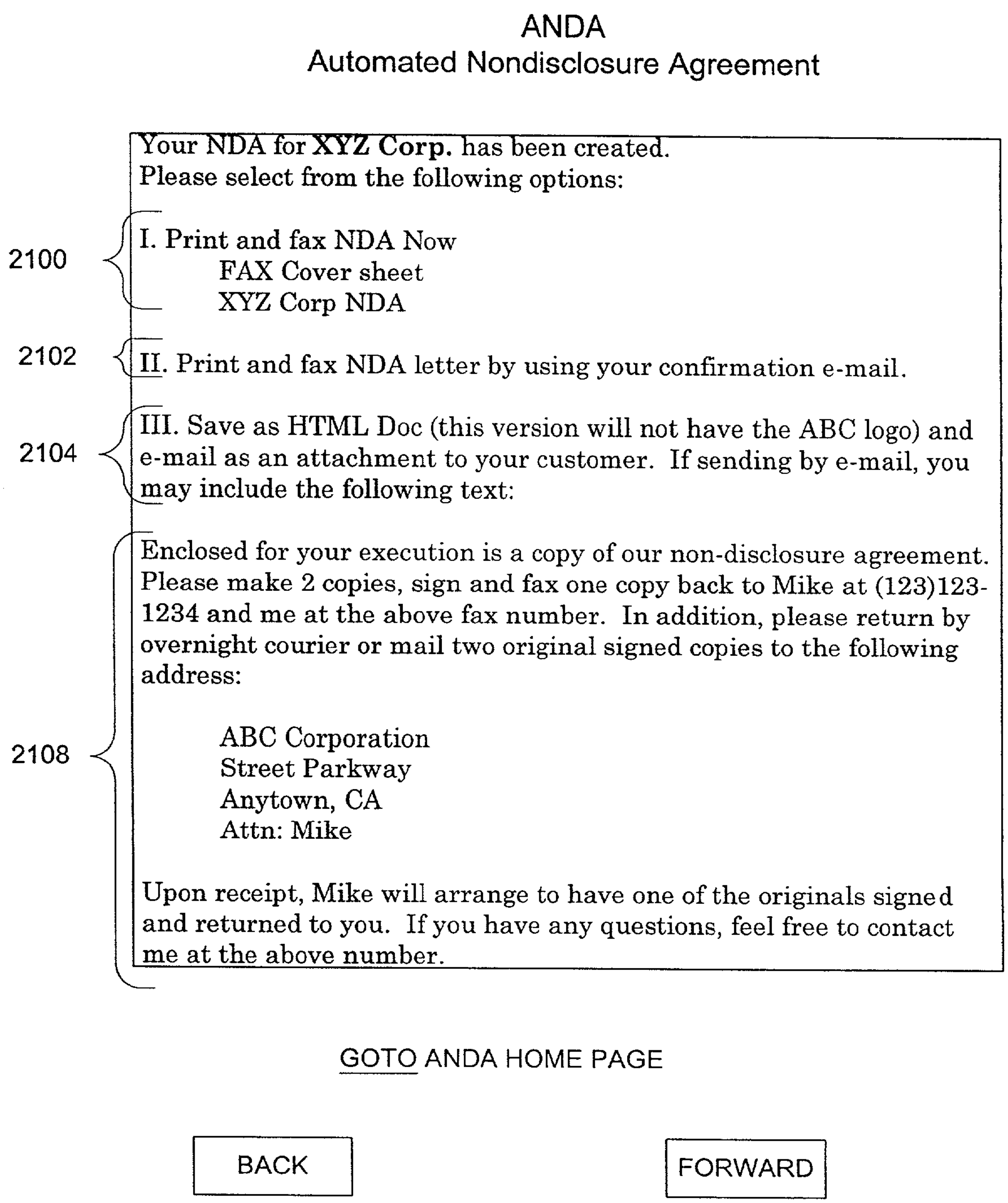
FIG. 14 is an exemplary customer Email message with legal document execution instructions as created by an embodiment of the present invention.

FIG. 14 is a NDA transmittal selection list for a NDA embodiment of a legal document server. As previously described, a legal document can be delivered to a recipient as either a facsimile transmission or as an attachment to an email. Alternatively, a hard copy of the legal document can be created by a requester for routing to the recipient via conventional means such as through the mail. The requestor uses the legal document transmittal selection list to select a legal document delivery method. If a requester selects "I. Print and fax NDA Now", the legal document can be sent to a local printer. The requestor sends the printed legal document with a cover sheet by facsimile transmission to a recipient. If the requester selects "II. Print and fax NDA later by using your confirmation email", the requestor can postpone sending the NDA to a later time. If the requestor selects "III. Save as HTML Doc . . . ", the legal document can be sent to the recipient as an HTML document attached to an email message as previously described.

Figure 15:
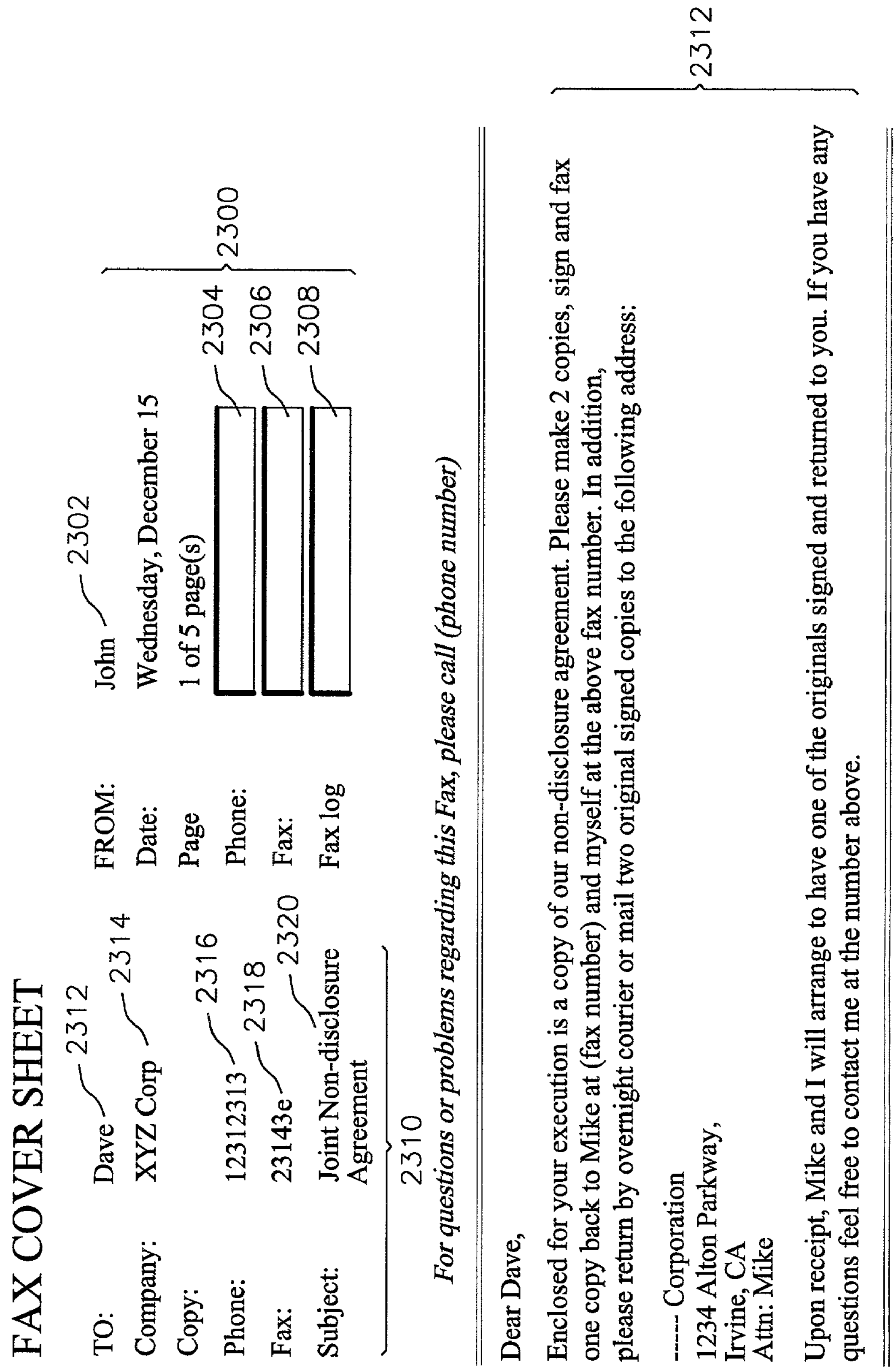

FIG. 15 is an exemplary recipient facsimile transmission cover sheet with legal document execution instructions as created by a NDA embodiment of a legal document server. The facsimile transmission cover sheet includes a synopsis 2300 of previously described requester information sent to a legal document server. The synopsis includes the name of the requestor 2302, a requester telephone number 2304, a telephone number 2306 to reach a facsimile transmission terminal associated with the requestor, and a facsimile transmission record number field 2308.

The facsimile transmission cover sheet further includes a synopsis 2310 of the previously described recipient information. The synopsis includes a data field for the name of the person responsible for execution of the legal document, the name of a recipient 2314, a telephone number for the person responsible for execution of the legal document, a telephone number 2316 to reach a facsimile transmission terminal associated with the recipient 2318, and a reminder of the subject matter of the legal document.

The recipient facsimile transmission cover sheet further includes legal document execution instructions 2312. These are instructions to the person responsible for execution of the legal document on how to execute the legal document and return executed copies to a legal document administrator.

Figure 19:
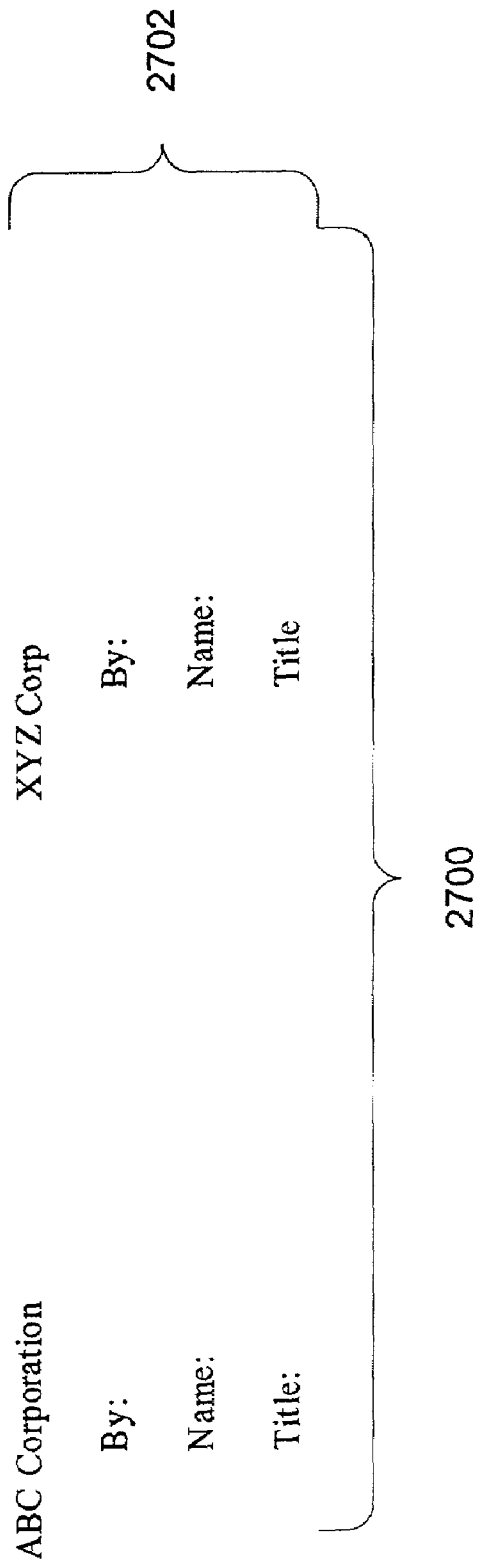
FIG. 19 is an exemplary legal document administrator Email message as created by an embodiment of the present invention.

FIGS. 16–19 depict an exemplary legal document as created by a NDA embodiment of a legal document server. The exemplary legal document is a NDA as generated using recipient and subject matter information entered into a legal document request form as described in FIG. 11. Referring to FIG. 16, the exemplary legal document includes a preamble portion 2400 containing data fields for a legal description of a recipient and related subject matter. The exemplary legal document further includes a clause portion 2408 containing clauses generated by the NDA embodiment of a legal document server. The clause portion extends across FIG. 17 2500 and FIG. 18 2600. Referring to FIG. 19, the exemplary legal document further includes a signatory portion 2700 for execution of the exemplary legal document by a recipient and a legal document administrator.

Referring again to FIG. 16, the exemplary legal document includes a preamble portion 2400 containing legal descriptions of the parties to the exemplary legal document and the information and materials covered by the exemplary legal document. The preamble portion includes an effective date of the exemplary legal document 2402. The preamble portion further includes recipient information sufficient to create a legal description of the recipient such as the name of the recipient 2404. The preamble portion further includes a legal description 2406 of the subject matter covered by the exemplary legal document.

A clause portion 2408 contains clauses describing the rights and obligations of the signatories. The clause portion extends across FIG. 17 2500 and FIG. 18 2600.

Referring to FIG. 19, a signatory portion 2700 of the exemplary legal document includes data fields for the signature, name, and title 2702 of a person responsible for the execution of the exemplary legal document on behalf of the recipient. The signatory portion further includes data fields for the signature, name, and title 2704 of a legal document administrator.

Figure 20:
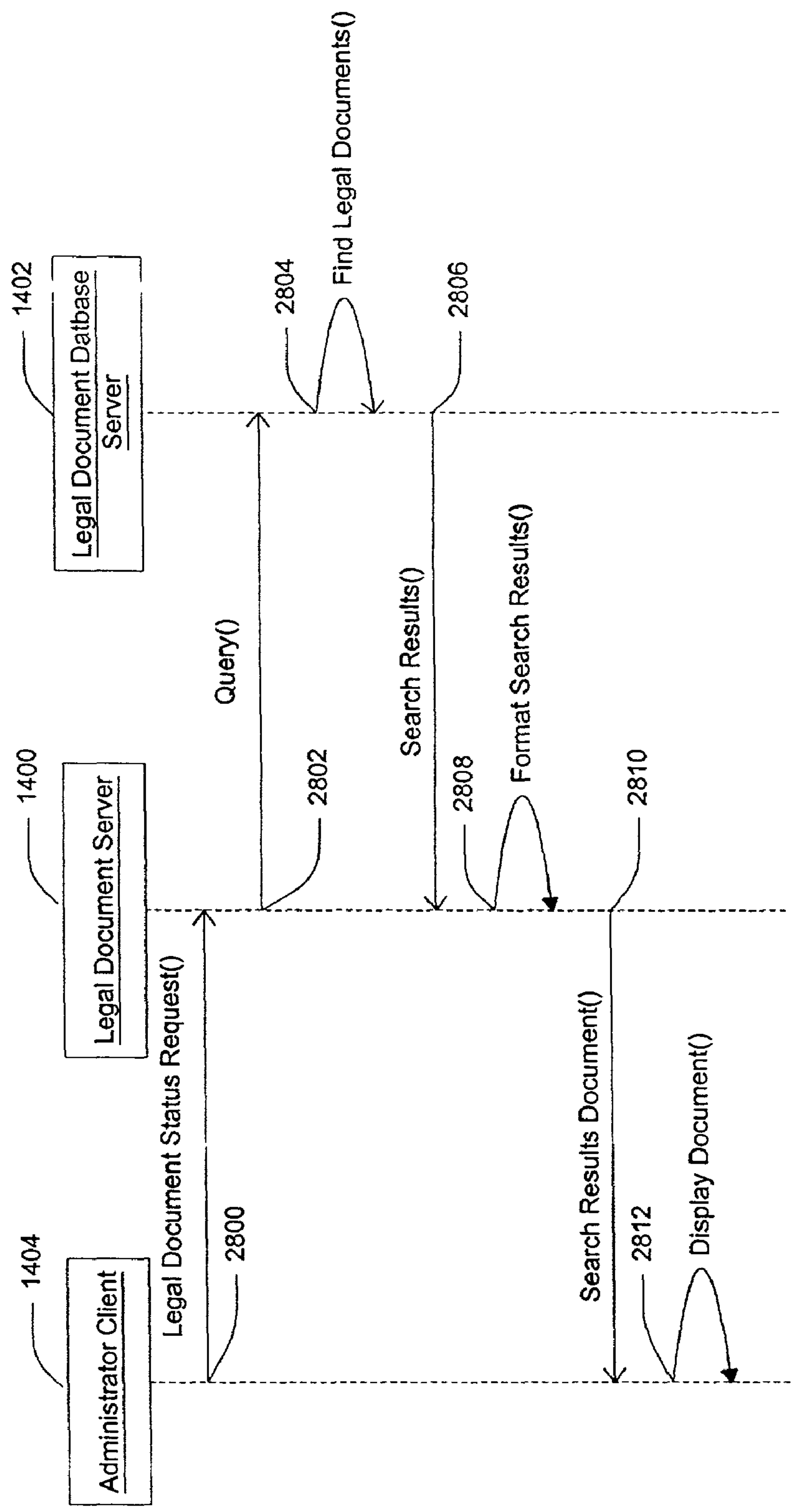
FIG. 20 is a sequence diagram of a legal document status report generation process of an embodiment of the present invention.

FIG. 20 is a sequence diagram of a legal document status report generation process of an embodiment of a legal document server. In one embodiment, a legal document server provides information about issued and pending legal documents. For example, a legal document administrator may need to know how many legal documents have been issued to a particular recipient.

The legal document administrator uses an administrator client 1404 to access a legal document server 1400 and sends a legal document status request 2800 to the legal document server. The legal document server generates a query 2802 based on the legal document status request. The legal document server sends the query to a legal document database server and the legal document database server finds 2804 the legal documents satisfying the query and creates a data set of search results. The legal document server sends the search results 2806 to the legal document server. The legal document server formats the search results into a search result document 2810. The search result document can be sent to the administrator client and the administrator client displays 2812 the search result document to the legal document administrator.

Referring again to FIG. 10 illustrating a home page for a NDA embodiment of a legal document server, a legal document administrator reaches a legal document status reporting embodiment of the current invention by selecting "View and Amend Pre-Existing NDA's (Requires log in)" 1802.

Figure 21:
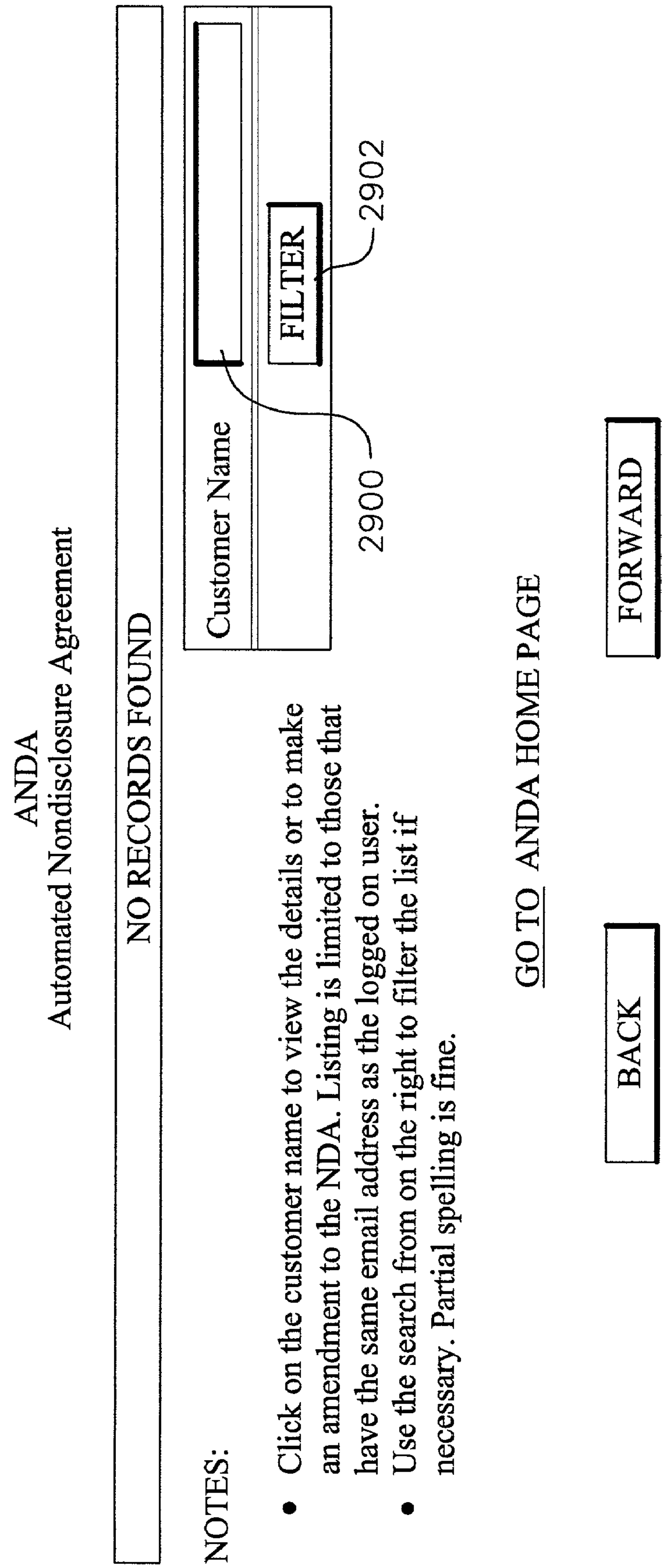
FIG. 21 is a home page of a legal document status reporting embodiment of the present invention.

FIG. 21 is a search entry form of a legal document status reporting embodiment of the present invention. The form includes a customer name entry field 2900 for entry of a recipient name used to search the legal document database. A legal document administrator searches of legal documents issued to recipient by entering a recipient name in the customer name entry field and selecting the "Filter" button 2902.

Figure 22:
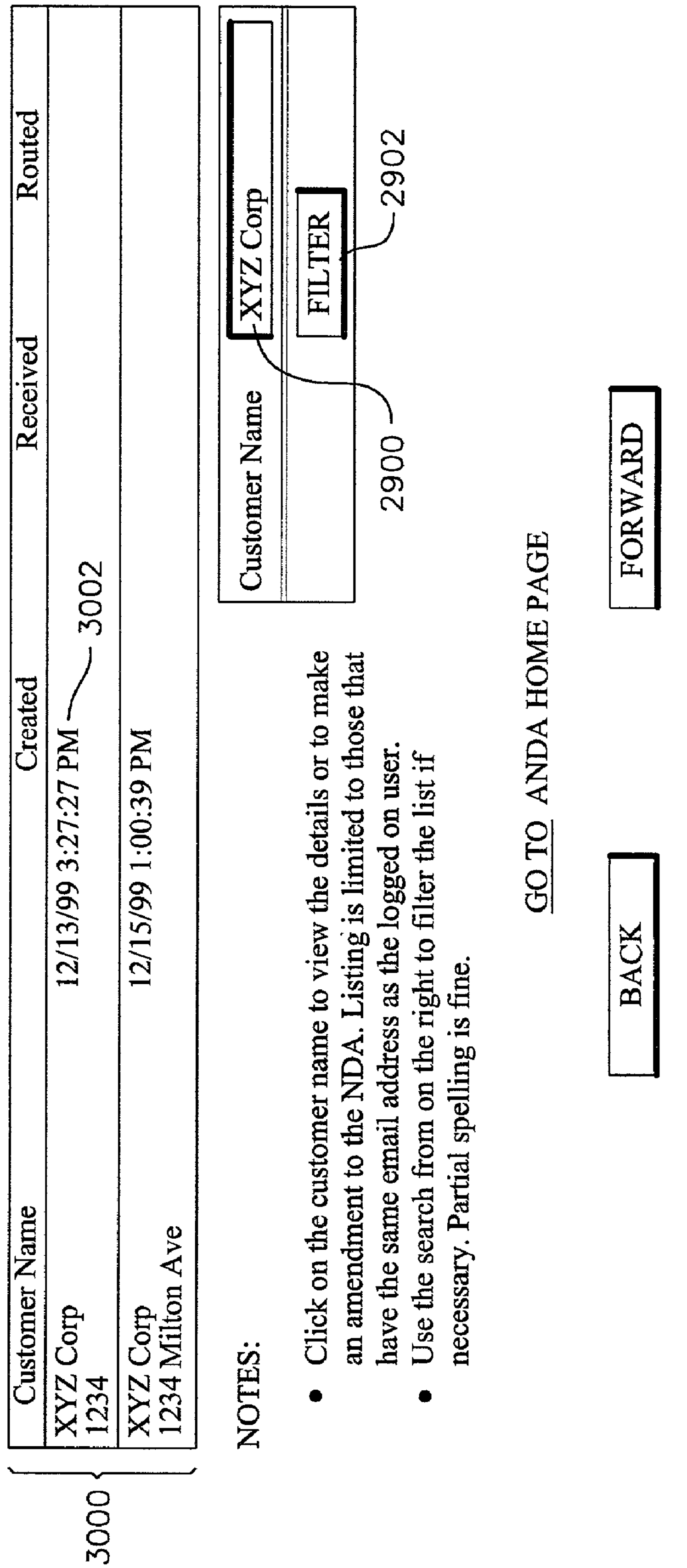
FIG. 22 is a search entry form of a legal document status reporting embodiment of the present invention.

FIG. 22 is a search entry form and a filtered result list of a legal document status reporting embodiment of the present invention. This form can be the same form as the form illustrated in FIG. 21 after entering a recipient name in the customer name entry field 2900 and selecting the "Filter" button 2902. The form includes a recipient list portion 3000 including an identifier 3002 for a legal document recipient. Selecting the identifier brings up a legal document status report of legal documents sent to the recipient a legal document server.

Figure 23:
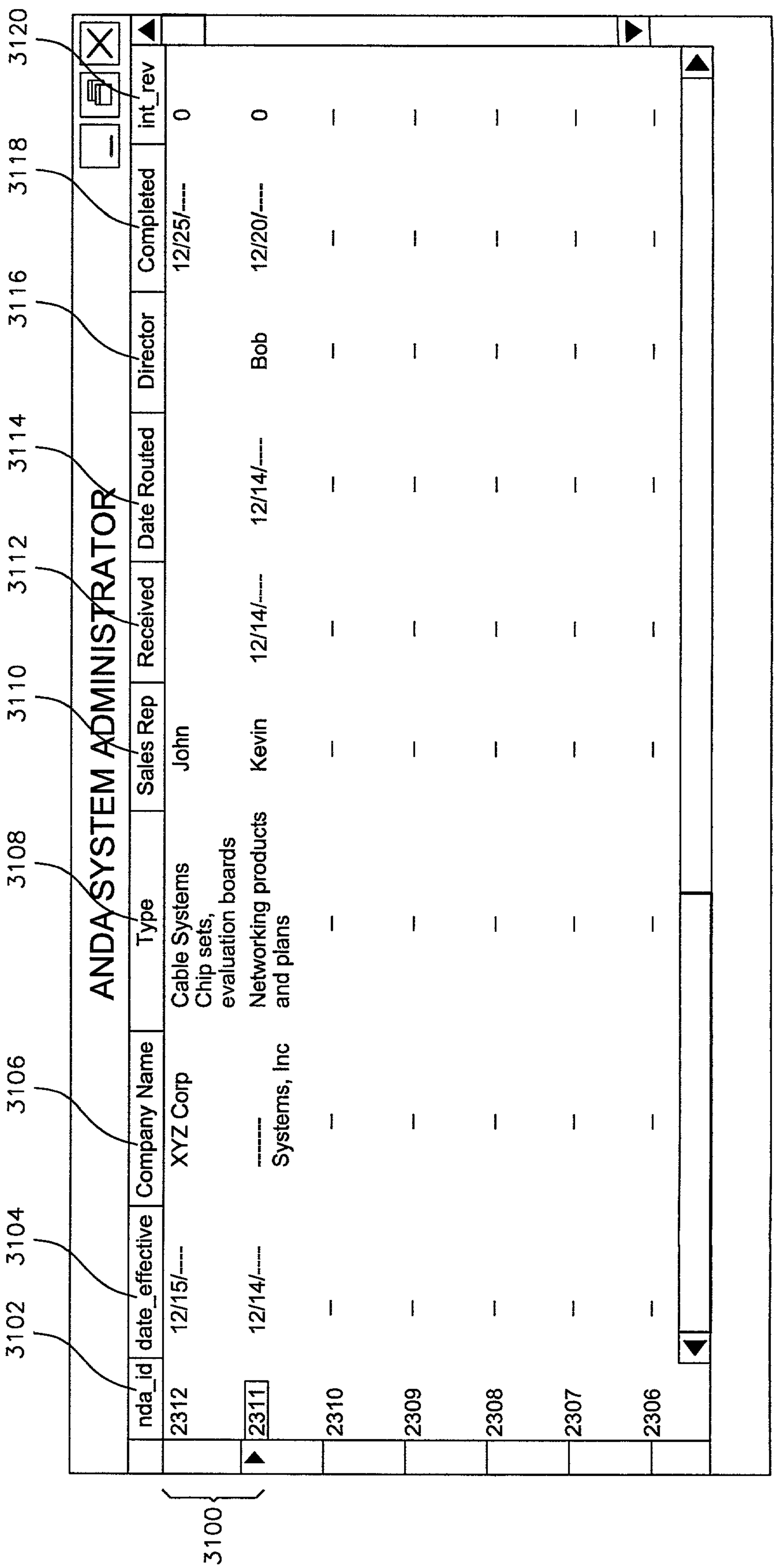
FIG. 23 is a search entry form and result list of a legal document status reporting embodiment of the present invention.

FIG. 23 is a legal document status report generated by a legal document status reporting embodiment of the present invention. The legal document status report can be comprised of rows of legal document status records, each legal document status record containing a set of data fields. Each legal document status record corresponds to a legal document issued by a legal document server.

For example, legal document status record 3100 contains nda_id data field 3102. This data field contains the legal document identification number for retrieval of the legal document from a legal document database server by a legal document server.

The legal document status record further includes: a date_effective data field 3104 containing the date by which the legal document is expected to be executed and become effective; a company name data field 3106 containing the name of the legal document recipient; a type data field 3108 containing a synopsis of the previously described subject matter of the legal document; a sales representative data field 3110 containing the name of the legal document requestor; a date received data field 3112 containing the date a legal document request was received for the legal document; a date routed data field 3114 containing the date the legal document was routed to relevant legal document administrators for approval; a director data field 3116 containing the name of the director of the program generating the samples or information covered by the legal document; a date completed data field 3118 containing the date the legal document was approved and generated; and an int_rev field containing the number of times the legal document was revised or amended.

In one embodiment of a legal document status report, the entry in the company name data field indicates the status of the NDA. If the NDA approval process has not been completed, the recipient name is shown in a simple text format. If the NDA approval process has been completed, the recipient name is shown as a hypertext link to a to be described amendment form linked to the approved NDA. In another embodiment of a legal document status report, the hyperlink is disabled once the NDA has expired.

In one embodiment of a legal document server, a legal document administrator can create an amendment to an existing legal document and send the amendment to a recipient. Referring again to FIG. 22, a legal document administrator uses the previously described search entry form and a filtered result list to select a legal document to amend.

Figure 24:
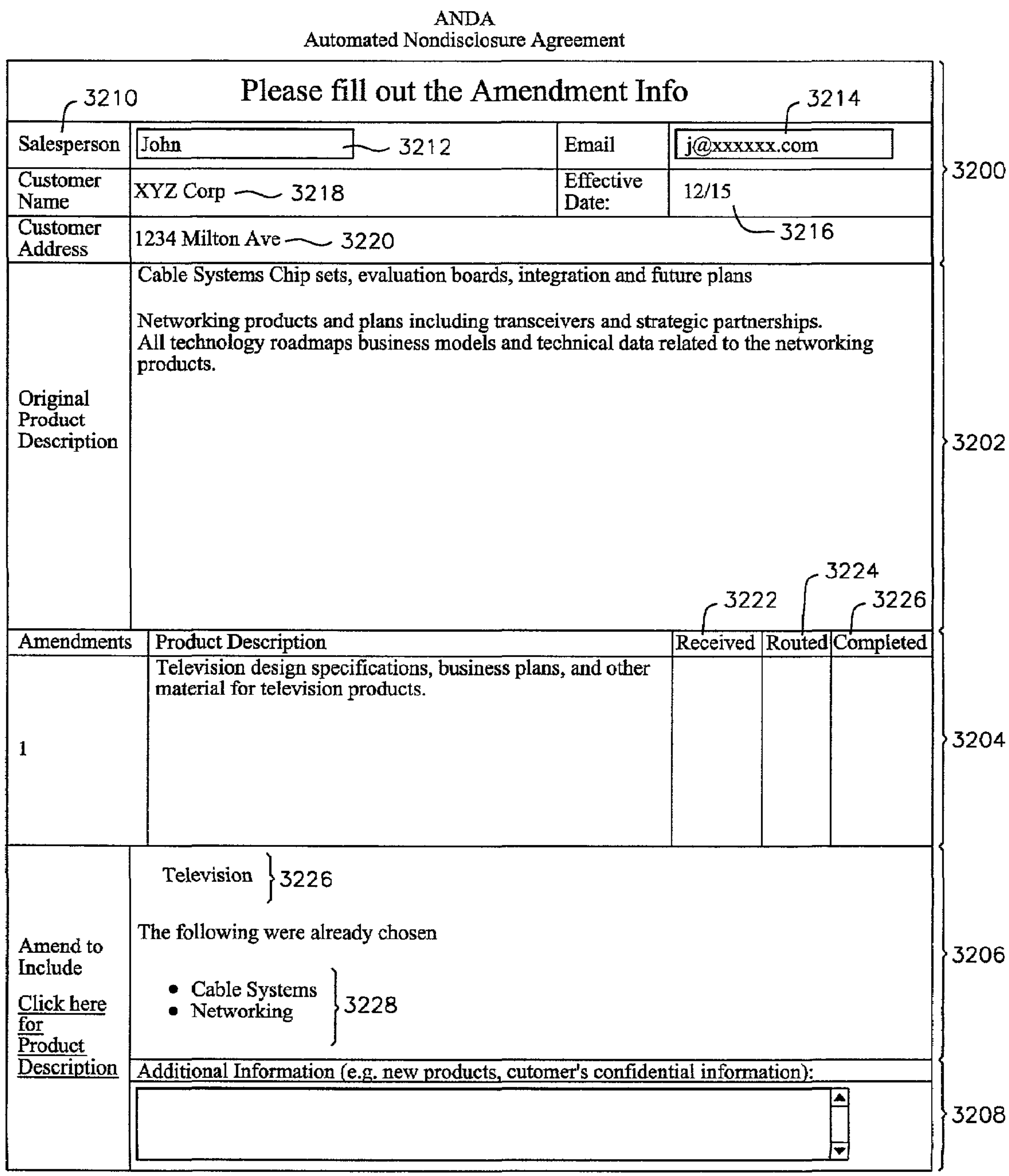
FIG. 24 is a legal document status report generated by a legal document status reporting embodiment of the present invention.
Figure 25:
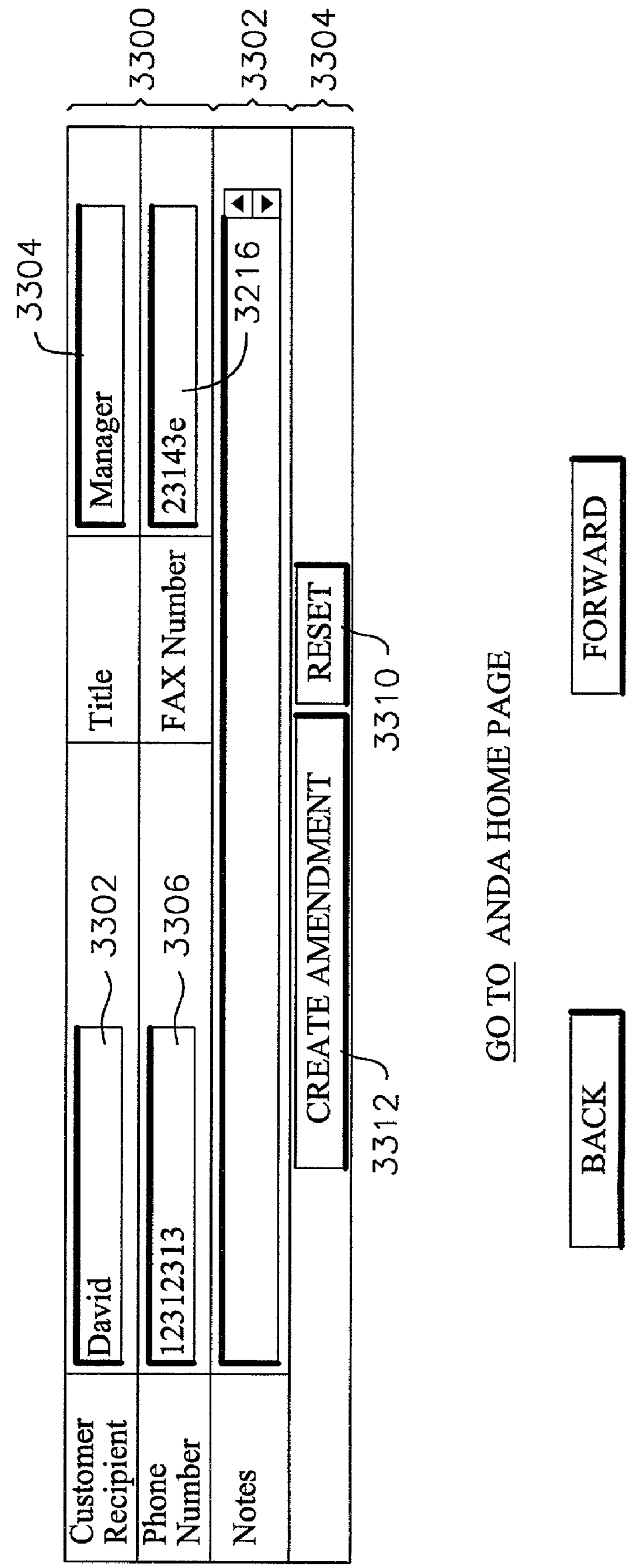
FIG. 25 is a sequence diagram of a legal document amendment process of an embodiment of the present invention.

FIGS. 24 and 25 depict a legal document amendment form of a NDA embodiment of a legal document server. A legal document administrator receives this form in response to selecting a legal document to amend. Referring to FIG. 24, the legal document amendment form includes a requester and recipient information portion 3200, an original product description portion 3202, an amendment history portion 3204, a requested amendment portion 3206, and a recipient information portion 3208. Referring to FIG. 25, the legal document amendment form further includes a signatory portion 3300, a notes portion 3302, and a command portion 3304.

Referring again to FIG. 24, a recipient and requestor information portion 3200 includes data fields for the display of recipient information. The displayed recipient information is the recipient information associated with the selected legal document to be amended. The name of the recipient can be displayed in customer name data field 3218. The address of the recipient can be displayed in customer address data field 3220. An effective date for the selected legal document can be displayed in effective date data field 3216.

The recipient and requestor information portion further includes data entry fields for the requester information. A requestor name can be entered into a salesperson data field 3210 and a requester email address is entered into an email data field 3214.

An original product description portion 3202 contains the original subject matter information of the selected legal document.

An amendment history portion 3204 contains information about previous amendments to the selected legal document. The amendment history portion includes an amendments data field for displaying the number of times the selected legal document has been previously amended. The amendment history portion further includes a received data field 3222 for display of the date an amendment was received, a routed data field 3224 for display of the date the received amendment was routed to the appropriate legal document administrators, and a completed data field 3226 for display of the date on which the received amendment received its final approval and was generated a legal document server.

A requested amendment portion 3206 includes a subject matter selection list 3226 for selecting subject matter for the amendment. The requested amendment portion further includes a previously chosen subject matter list 3228 for display of the subject matter already covered by the selected legal document. A requester uses the subject matter selection list to select subject matter for to added by amendment to the selected legal document.

A recipient information portion 3208 provides an free format text input area for entering recipient information by a requester.

Referring again to FIG. 25, the legal document amendment form further includes a signatory portion 3300. The signatory portion includes a customer recipient name data field 3302 for entry by a requestor of a name of a person responsible for execution of the amendment on behalf of the recipient. The signatory portion further includes a title data field 3304 for entry of the title of the person responsible for execution of the amendment on behalf of the recipient, a phone number data field 3306 for entry of a phone number for the person responsible for execution of the amendment on behalf of the recipient, and a fax data field 3308 for entry of a telephone number by which a facsimile transmission terminal may be reached for transmitting facsimile transmissions to the person responsible for execution of the amendment on behalf of the recipient.

A notes portion 3302 provides for free format text entry of miscellaneous information by the requester about a recipient.

A command portion 3304 provides command buttons for clearing the data fields of the legal document amendment form and for submitting the legal document amendment form to a legal document server. Selecting a "RESET" button 3310 clears the data fields of the legal document amendment form. Selecting a "CREATE AMENDMENT" submits the legal document amendment form to a legal document server for processing and generation of a legal document amendment.

As previously described, a legal document can be delivered to a recipient as either a facsimile transmission, as an attachment to an email, or as a hard copy delivered by a requester to a recipient using conventional deliver methods such as mail. In one embodiment of legal document server, amendments to a legal document are delivered to a recipient in the same way as a legal document.

FIG. 26 depicts an exemplary amendment as created by a NDA embodiment of a legal document server. The exemplary amendment is an amendment to a NDA. The amendment can be generated using recipient and subject matter information entered into a legal document amendment form as described in FIGS. 24 and 25. The exemplary amendment includes a preamble portion 3400 containing data fields for a legal description of a recipient and related subject matter. The exemplary amendment further includes a clause portion 3404 containing clauses generated by the NDA embodiment of a legal document server. The exemplary amendment further includes a signatory portion 3406 for execution of the exemplary legal document by a recipient and a legal document administrator.

The preamble portion contains legal descriptions of the parties to the exemplary legal document and subject matter information including the materials covered by the exemplary amendment. The preamble portion includes an effective date of the exemplary amendment 3408. The preamble portion further includes recipient information sufficient to create a legal description of the recipient such as the name of the recipient 3410. The preamble portion further includes a legal description of the legal document being amended by the exemplary amendment 3412. The preamble portion further includes a legal description 2406 of the subject matter covered by the exemplary legal document.

A clause portion 3404 contains clauses describing the rights and obligations of signatories to the amendment. In the exemplary amendment, a single clause provides that the new subject matter can be added to the existing NDA and all other terms and provisions remain in effect.

The signatory portion of the exemplary amendment includes data fields for the signature, name, and title 3416 of a person responsible for the execution of the exemplary amendment on behalf of the recipient. The signatory portion further includes data fields for the signature, name, and title 3418 of a legal document administrator.

The preceding description has been presented with reference to specific embodiments of the invention shown in the drawings. Workers skilled in the art and technology to which this invention pertains will appreciate that alteration and changes in the described processes and structures can be practiced without departing from the spirit, principles and scope of this invention.

Although this invention has been described in certain specific embodiments, many additional modifications and variations would be apparent to those skilled in the art. It is therefore to be understood that this invention may be practiced otherwise than as specifically described. Thus, the present embodiments of the invention should be considered in all respects as illustrative and not restrictive, the scope of the invention to be determined by the claims supported by this application and their equivalents rather than the foregoing description.

What is claimed is:

1. A method for interactively generating and delivering documents requested by a remote requestor for a recipient other than the requestor via a computer network, comprising:

receiving from the remote requestor via the computer network a document request, the document request including recipient and subject matter information;

generating a document according to the recipient and subject matter information responsive to the document request;

storing the document in a document database;

receiving an approval message from a remote party other than the requestor or the recipient, the approval message indicating approval of the document;

updating an approval status report based on the approval message;

transmitting the approval status report separately from the document in response to a report request; and transmitting the document to the recipient.

2. The method of claim 1, further comprising obtaining approval from a document administrator before generating the document.

3. The method of claim 1, further comprising:

transmitting via the computer network a document generation notice to the requestor; and receiving via the computer network document transmission instructions from the requestor.

4. The method of claim 1 wherein transmitting the document to the recipient comprises transmittal by facsimile transmission, the facsimile transmission further including document execution instructions.

5. The method of claim 1, wherein transmitting the document to the recipient comprises transmittal by electronic mail, the electronic mail further including document execution instructions.

6. The method of claim 1, further comprising:

receiving a document status request via the computer network from the requestor, the document status request including a recipient identification;

generating a document status report using the document database and the recipient identification; and transmitting via the computer network the document status report to the requestor.

7. The method of claim 1, further comprising:

receiving via the computer network a document amendment request from the requestor, the document amendment request including a document identifier and subject matter information;

retrieving the stored document from the document database using the document identifier;

generating a document amendment using the subject matter information and the retrieved document;

storing the document amendment in the document database; and transmitting via the computer network the document amendment to the recipient.

8. The method of claim 7 wherein the document is a version controlled document.

9. A method for interactively generating and delivering via a computer network non-disclosure agreements requested by a remote marketing representative for a customer other than the marketing representative, comprising:

receiving from the remote marketing representative a non-disclosure agreement request, the non-disclosure agreement request including customer and product information;

receiving an approval message from a remote party other than the marketing representative or the customer, the approval message indicating approval of a non-disclosure agreement;

updating an approval status report based on the approval message;

transmitting the approval status report separately from the non-disclosure agreement in response to a report request;

generating the non-disclosure agreement according to the non-disclosure agreement request;

storing the non-disclosure agreement in a non-disclosure agreement database;

transmitting a non-disclosure agreement generation notice to the marketing representative;

receiving non-disclosure transmission instructions from the marketing representative; and transmitting the non-disclosure agreement to the customer.

10. The method of claim 9 wherein sending the non-disclosure agreement to the customer comprises transmittal by facsimile transmission, the facsimile transmission further including non-disclosure agreement execution instructions.

11. The method of claim 9, wherein sending the non-disclosure agreement to the customer comprises transmittal by electronic mail, the electronic mail further including non-disclosure agreement execution instructions.

12. The method of claim 9 wherein the non-disclosure agreement is a version controlled non-disclosure agreement.

13. The method of claim 9, further comprising:

receiving a non-disclosure agreement amendment request from the marketing representative, the non-disclosure agreement amendment including a non-disclosure agreement identification and subject matter information;

retrieving the non-disclosure agreement from the non-disclosure agreement database using the non-disclosure agreement identification;

generating a non-disclosure agreement amendment using the subject matter information and the retrieved non-disclosure agreement; and transmitting the non-disclosure agreement amendment to the customer.

14. The method of claim 13 wherein sending the non-disclosure agreement to the customer comprises transmittal by facsimile transmission, the facsimile transmission further including non-disclosure agreement execution instructions.

15. The method of claim 13, wherein sending the non-disclosure agreement to the customer comprises transmittal by electronic mail, the electronic mail further including non-disclosure agreement execution instructions.

16. The method of claim 13, wherein the non-disclosure agreement is a version controlled non-disclosure agreement.

17. A data processing system adapted to interactively generate and deliver documents requested by a remote requestor for a recipient other than the requestor via a computer network, comprising:

a processor; and a memory operably coupled to the processor and having program instructions stored therein, the processor being operable to execute the program instructions, the program instructions including:

receiving from the remote requestor via the computer network a document request, the document request including recipient and subject matter information;

generating a document according to the recipient and subject matter information responsive to the document request;

storing the document in a document database;

receiving an approval message from a remote party other than the requestor or the recipient, the approval message indicating approval of the document;

updating an approval status report based on the approval message;

transmitting the approval status report separately from the document in response to a report request; and transmitting the document to the recipient.

18. The data processing system of claim 17, the instructions further including obtaining approval from a document administrator before generating the document.

19. The data processing system of claim 17, the instructions further including:

transmitting via the computer network a document generation notice to the requestor; and receiving via the computer network document transmission instructions from the requestor.

20. The data processing system of claim 17 wherein the document transmitting instructions include transmittal by facsimile transmission, the facsimile transmission further including document execution instructions.

21. The data processing system of claim 17 wherein the document transmitting instructions include transmittal by electronic mail, the electronic mail further including document execution instructions.

22. The data processing system of claim 17, the instructions further including:

receiving a document status request via the computer network from the requestor, the document status request including a recipient identification;

generating a document status report using the document database and the recipient identification; and transmitting via the computer network the document status report to the requestor.

23. The data processing system of claim 17, the instructions further including:

receiving via the computer network a document amendment request from the requestor, the document amendment request including a document identifier and subject matter information;

retrieving the stored document from the document database using the document identifier;

generating a document amendment using the subject matter information and the retrieved document;

storing the document amendment in the document database; and transmitting via the computer network the document amendment to the recipient.

24. The data processing system of claim 23 wherein the document is a version controlled document.

25. A data processing system adapted to interactively generate and deliver non-disclosure agreements requested by a remote marketing representative for a customer other than the marketing representative, comprising:

a processor; and a memory operably coupled to the processor and having program instructions stored therein, the processor being operable to execute the program instructions, the program instructions including:

receiving from the marketing representative a non-disclosure agreement request, the non-disclosure agreement request including customer and product information;

receiving an approval message from a remote party other than the marketing representative or the customer, the approval message indicating approval of a non-disclosure agreement;

updating an approval status report based on the approval message;

transmitting the approval status report separately from the non-disclosure agreement in response to a report request;

generating the non-disclosure agreement according to the non-disclosure agreement request;

storing the non-disclosure agreement in a non-disclosure agreement database;

transmitting a non-disclosure agreement generation notice to the marketing representative;

receiving non-disclosure agreement transmission instructions from the marketing representative; and transmitting the non-disclosure agreement to the customer.

26. The data processing system of claim 25 wherein the non-disclosure agreement is a version controlled non-disclosure agreement.

27. The data processing system of claim 25, the instructions further including sending the non-disclosure agreement to the customer by facsimile transmission, the facsimile transmission further including non-disclosure agreement execution instructions.

28. The data processing system of claim 25, the instructions further including sending the non-disclosure agreement to the customer by electronic mail, the electronic mail further including non-disclosure agreement execution instructions.

29. The data processing system of claim 25, the instructions further including:

receiving a non-disclosure agreement amendment request from the marketing representative, the non-disclosure agreement amendment including a non-disclosure agreement identification and subject mailer information;

retrieving the non-disclosure agreement from the non-disclosure agreement database using the non-disclosure agreement identification;

generating a non-disclosure agreement amendment using the subject matter information and the retrieved non-disclosure agreement; and transmitting the non-disclosure agreement amendment to the customer.

30. The data processing system of claim 29 wherein the non-disclosure agreement is a version controlled non-disclosure agreement.

31. The data processing system of claim 29, the instructions further including sending the non-disclosure agreement to the customer by facsimile transmission, the facsimile transmission further including non-disclosure agreement execution instructions.

32. The data processing system of claim 29, the instructions further including sending the non-disclosure agreement to the customer by electronic mail, the electronic mail further including non-disclosure agreement execution instructions.

33. A computer-readable storage medium embodying computer program instructions for execution by a computer, the computer program instructions adapting a computer to interactively generate and deliver documents requested by a remote requestor for a recipient other than the requestor via a computer network, the computer program instructions comprising:

receiving from the remote requestor via the computer network a document request, the document request including recipient and subject matter information;

generating a document according to the recipient and subject matter information responsive to the document request;

storing the document in a document database;

receiving an approval message from a remote party other than the requestor or the recipient, the approval message indicating approval of the document;

updating an approval status report based on the approval message;

transmitting the approval status report separately from the document in response to a report request; and transmitting the document to the recipient.

34. The computer-readable storage medium of claim 33, the instructions further comprising obtaining approval from a document administrator before generating the document.

35. The computer-readable storage medium of claim 33, the instructions further comprising:

transmitting via the computer network a document generation notice to the requestor; and receiving via the computer network document transmission instructions from the requestor.

36. The computer-readable storage medium of claim 33 wherein the document transmitting instructions include transmittal by facsimile transmission, the facsimile transmission further including document execution instructions.

37. The computer-readable storage medium of claim 33 wherein the document transmitting instructions include transmittal by electronic mail, the electronic mail further including document execution instructions.

38. The computer-readable storage medium of claim 33, the instructions further comprising:

receiving a document status request via the computer network from the requestor, the document status request including a recipient identification;

generating a document status report using the document database and the recipient identification; and transmitting via the computer network the document status report to the requestor.

39. The computer-readable storage medium claim 33, the instructions further comprising:

receiving via the computer network a document amendment request from a requestor, the document amendment request including a document identifier and subject matter information;

retrieving a stored document from the document database using the document identifier;

generating a document amendment using the subject matter information and the retrieved document;

storing the document amendment in the document database; and transmitting via the computer network the document amendment to the recipient.

40. The computer-readable storage medium of claim 39 wherein the document is a version controlled document.

41. A computer-readable storage medium embodying computer program instructions for execution by a computer, the computer program instructions adapting a computer to generate and deliver non-disclosure agreements requested by a remote marketing representative for a customer other than the marketing representative, the computer program instructions comprising:

receiving from the remote marketing representative a non-disclosure agreement request, the non-disclosure agreement request including customer and product information;

receiving an approval message from a remote party other than the marketing representative or the customer, the approval message indicating approval of a non-disclosure agreement;

updating an approval status report based on the approval message;

transmitting the approval status report separately from the non-disclosure agreement in response to a report request;

generating the non-disclosure agreement according to the non-disclosure agreement request;

storing the non-disclosure agreement in a non-disclosure agreement database; transmitting a non-disclosure agreement generation notice to the marketing representative;

receiving non-disclosure transmission instructions from the marketing representative; and transmitting the non-disclosure agreement to the customer.

42. The computer-readable storage medium of claim 41 wherein the non-disclosure agreement is a version controlled non-disclosure agreement.

43. The computer-readable storage medium of claim 41, the instructions further comprising sending the non-disclosure agreement to the customer by facsimile transmission, the facsimile transmission further including non-disclosure agreement execution instructions.

44. The computer-readable storage medium of claim 41, the instructions further comprising sending the non-disclosure agreement to the customer by electronic mail, the electronic mail further including non-disclosure agreement execution instructions.

45. The computer-readable storage medium of claim 41, the instructions further comprising:

receiving a non-disclosure agreement amendment request from the marketing representative, the non-disclosure agreement amendment including a non-disclosure agreement identification and subject matter information;

retrieving the non-disclosure agreement from the non-disclosure agreement database using the non-disclosure agreement identification;

generating a non-disclosure agreement amendment using the subject matter information and the retrieved non-disclosure agreement; and transmitting the non-disclosure agreement amendment to the customer.

46. The computer-readable storage medium of claim 45 wherein the non-disclosure agreement is a version controlled non-disclosure agreement.

47. The computer-readable storage medium of claim 45, the instructions further comprising sending the non-disclosure agreement to the customer by facsimile transmission, the facsimile transmission further including non-disclosure agreement execution instructions.

48. The computer-readable storage medium of claim 45, the instructions further comprising sending the non-disclosure agreement to the customer by electronic mail, the electronic mail further including non-disclosure agreement execution instructions.

49. A method for interactively generating and delivering documents via a computer network, the method comprising:

receiving from a remote computer via the computer network a document request, the document request including recipient and subject matter information;

searching a database for a document template associated with the document request;

inserting the recipient and subject matter information into the document template and generating a final document;

storing the final document in a data store;

transmitting to the remote computer over the computer network a notification indicative of the generated final document, the notification being transmitted separately from the generated final document;

receiving an approval message from a remote party other than a party transmitting the document request or a recipient to whom the final document is to be transmitted, the approval message indicating approval of the final document;

updating an approval status report based on the approval message;

transmitting the approval status report separately from the final document in response to a report request;

displaying on the remote computer a plurality of available transmission modes;

receiving from the remote computer identification of one of the plurality of available transmission modes;

formatting the final document based on the identified transmission mode; and transmitting the final document to a recipient computer over the computer network according to the identified transmission mode, the final document being transmitted responsive to an indication of an approval of the final document.

* * * * *